US010522830B2

(12) United States Patent
Kaneda et al.

(10) Patent No.: US 10,522,830 B2
(45) Date of Patent: Dec. 31, 2019

(54) POSITIVE ELECTRODE ACTIVE MATERIAL FOR NONAQUEOUS ELECTROLYTE SECONDARY BATTERIES AND PRODUCTION METHOD THEREOF, AND NONAQUEOUS ELECTROLYTE SECONDARY BATTERY

(71) Applicant: SUMITOMO METAL MINING CO., LTD., Tokyo (JP)

(72) Inventors: Haruki Kaneda, Niihama (JP); Hiroko Oshita, Niihama (JP); Masanori Takagi, Niihama (JP); Ryozo Ushio, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 327 days.

(21) Appl. No.: 15/038,228

(22) PCT Filed: Nov. 20, 2014

(86) PCT No.: PCT/JP2014/080724
§ 371 (c)(1),
(2) Date: May 20, 2016

(87) PCT Pub. No.: WO2015/076323
PCT Pub. Date: May 28, 2015

(65) Prior Publication Data
US 2016/0293952 A1    Oct. 6, 2016

(30) Foreign Application Priority Data

Nov. 22, 2013    (JP) ................................. 2013-241871
Nov. 22, 2013    (JP) ................................. 2013-241889
(Continued)

(51) Int. Cl.
*H01M 4/525*    (2010.01)
*C01G 53/00*    (2006.01)
(Continued)

(52) U.S. Cl.
CPC .......... *H01M 4/525* (2013.01); *C01G 53/006* (2013.01); *C01G 53/42* (2013.01); *H01M 4/485* (2013.01);
(Continued)

(58) Field of Classification Search
None
See application file for complete search history.

(56) References Cited

U.S. PATENT DOCUMENTS

2004/0023113 A1    2/2004    Suhara et al.
2005/0266315 A1    12/2005    Sato et al.
(Continued)

FOREIGN PATENT DOCUMENTS

JP    2000-195514 A    7/2000
JP    2000-323143 A    11/2000
(Continued)

OTHER PUBLICATIONS

JP2011082150—English Translation (Year: 2011).*
(Continued)

*Primary Examiner* — Haroon S. Sheikh
(74) *Attorney, Agent, or Firm* — Westerman, Hattori, Daniels & Adrian, LLP

(57) ABSTRACT

Provided is a method for producing a positive electrode active material for nonaqueous electrolyte secondary batteries that achieves both high thermal stability and high charge/discharge capacity and has excellent cycle characteristics and an easy and safe production method thereof, and a nonaqueous electrolyte secondary battery using the positive electrode active material.

(Continued)

A method for producing a positive electrode active material for nonaqueous electrolyte secondary batteries includes a crystallization step of adding an alkaline aqueous solution to a mixed aqueous solution containing at least nickel and cobalt for crystallization to obtain a nickel-containing hydroxide represented by a general formula $Ni_{1-a'-b'}Co_{a'}M_{b'}(OH)_2$, a mixing step of mixing the obtained nickel-containing hydroxide, a lithium compound, and a niobium compound to obtain a lithium mixture, and a firing step of firing the lithium mixture in an oxidative atmosphere at 700 to 840° C. to obtain a lithium-transition metal composite oxide.

21 Claims, 1 Drawing Sheet

(30) Foreign Application Priority Data

Aug. 1, 2014 (JP) ................. 2014-157345
Aug. 1, 2014 (JP) ................. 2014-157346

(51) Int. Cl.
*H01M 4/485* (2010.01)
*H01M 4/505* (2010.01)
*H01M 4/02* (2006.01)
*H01M 4/131* (2010.01)
*H01M 10/052* (2010.01)

(52) U.S. Cl.
CPC ......... *H01M 4/505* (2013.01); *C01P 2002/50* (2013.01); *C01P 2002/52* (2013.01); *C01P 2002/60* (2013.01); *C01P 2004/61* (2013.01); *C01P 2006/12* (2013.01); *C01P 2006/80* (2013.01); *H01M 4/131* (2013.01); *H01M 10/052* (2013.01); *H01M 2004/021* (2013.01)

(56) References Cited

U.S. PATENT DOCUMENTS

| | | | |
|---|---|---|---|
| 2011/0195309 A1 | 8/2011 | Nina et al. | |
| 2011/0269018 A1 | 11/2011 | Kono et al. | |
| 2011/0281168 A1* | 11/2011 | Watanabe | H01M 4/525 429/223 |
| 2013/0108921 A1* | 5/2013 | Kase | H01M 4/485 429/211 |
| 2014/0186709 A1 | 7/2014 | Iwanaga et al. | |
| 2015/0010821 A1 | 1/2015 | Makimura et al. | |

FOREIGN PATENT DOCUMENTS

| | | |
|---|---|---|
| JP | 2002-151071 A | 5/2002 |
| JP | 2003-68298 A | 3/2003 |
| JP | 2005-339970 A | 12/2005 |
| JP | 2006-127923 A | 5/2006 |
| JP | 2006-147500 A | 6/2006 |
| JP | 2006-151707 A | 6/2006 |
| JP | 2006-265023 A | 10/2006 |
| JP | 2007-059342 A | 3/2007 |
| JP | 2008-153017 A | 7/2008 |
| JP | 2008-181839 A | 8/2008 |
| JP | 2009-140787 A | 6/2009 |
| JP | 2011-82150 A | 4/2011 |
| JP | 2011-187435 A | 9/2011 |
| JP | 2012-14887 A | 1/2012 |
| JP | 2012-160350 A | 8/2012 |
| JP | 2012-252964 A | 12/2012 |
| JP | 2013-26199 A | 2/2013 |
| JP | 2013-134822 A | 7/2013 |
| WO | 01/92158 A1 | 12/2001 |
| WO | WO-2011122448 A1 * | 10/2011 ............ H01M 4/485 |

OTHER PUBLICATIONS

JP2006151707—English Translation (Year: 2006).*
JP2000323143—English Translation (Year: 2003).*
International Search Report dated Feb. 10, 2015, issued in International Application No. PCT/JP2014/080724 (2 pages).
Office Action dated Jan. 9, 2018, issued in counterpart Japanese application No. 2014-157345, with English translation. (12 pages).
Office Action dated Jul. 31, 2018, issued in counterpart Japanese application No. 2014-157345, with English translation. (14 pages).
Office Action dated Mar. 26, 2019, issued in counterpart JP Application No. 2014-157346, with English translation (13 pages).

* cited by examiner

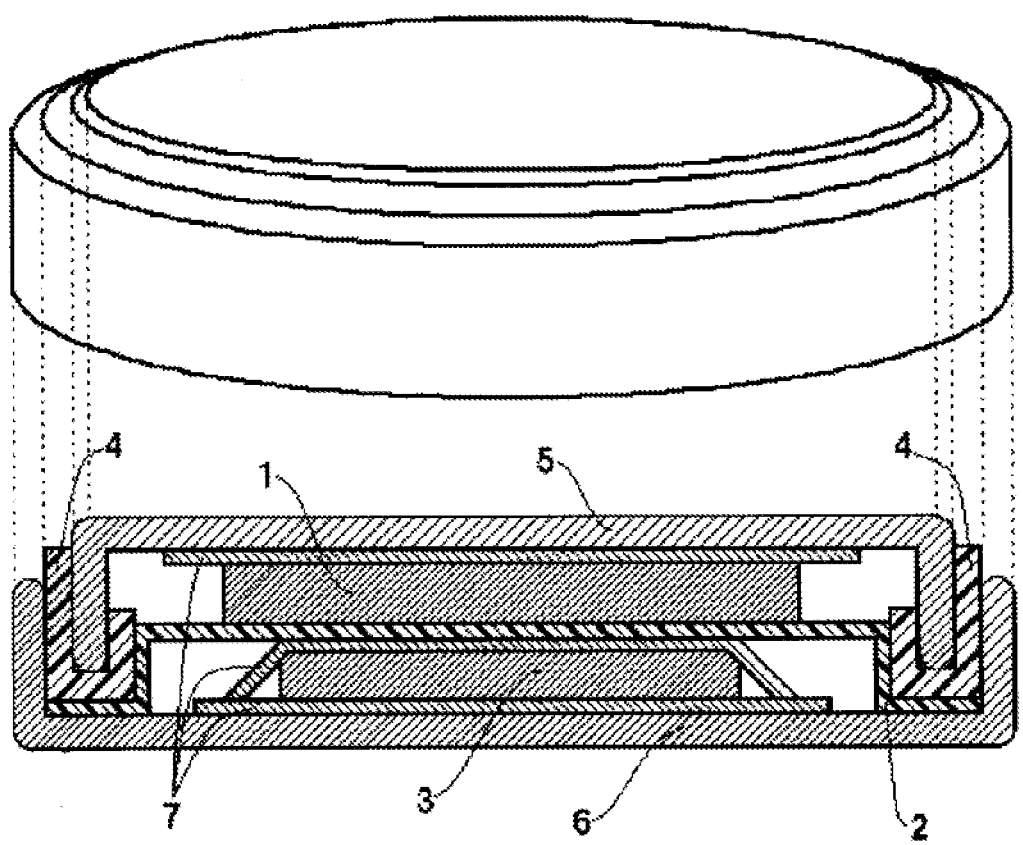

POSITIVE ELECTRODE ACTIVE MATERIAL FOR NONAQUEOUS ELECTROLYTE SECONDARY BATTERIES AND PRODUCTION METHOD THEREOF, AND NONAQUEOUS ELECTROLYTE SECONDARY BATTERY

TECHNICAL FIELD

The present invention relates to a positive electrode active material for nonaqueous electrolyte secondary batteries and a production method thereof, and a nonaqueous electrolyte secondary battery.

BACKGROUND ART

With the recent wide spread use of portable electronic devices, such as mobile phones and notebook personal computers, there has been a strong demand to develop small, light nonaqueous electrolyte secondary batteries having high energy density. Among such secondary batteries are lithium-ion secondary batteries. A lithium metal or lithium alloy, a metal oxide, carbon, or the like is used as the material of the negative electrode of a lithium-ion secondary battery. These materials can desorb and absorb lithium.

At present, lithium-ion secondary batteries are actively being researched and developed. Among others, a lithium-ion secondary battery using, as a positive electrode material, a lithium-transition metal composite oxide, particularly, a lithium-cobalt composite oxide ($LiCoO_2$), which is relatively easily synthesized, supplies a 4V-level high voltage. For this reason, such lithium-ion secondary batteries are being commercialized as batteries having high energy density. Many lithium-ion secondary batteries using a lithium-cobalt composite oxide ($LiCoO_2$) have been developed so far to obtain excellent initial capacity characteristics or cycle characteristics, and various fruits have already been produced.

However, a lithium-cobalt composite oxide ($LiCoO_2$) uses a rare, expensive cobalt compound as a raw material and therefore causes an increase in battery cost. For this reason, it is preferred to use a material other than a lithium-cobalt composite oxide ($LiCoO_2$) as a positive electrode active material.

Recently, there has been increased the demand to use lithium-ion secondary batteries not only as small secondary batteries for portable electronic devices but also as large secondary batteries for power storage or those for electric vehicles and the like. It is expected that if the cost of active materials is reduced so that cheaper lithium-ion secondary batteries can be produced, a significant ripple effect will reach a wide variety of fields. Among lithium-transition metal composite oxides newly proposed as positive electrode active materials for lithium-ion secondary batteries are a lithium-manganese composite oxide ($LiMn_2O_4$) using manganese, which is cheaper than cobalt, and a lithium-nickel composite oxide ($LiNiO_2$) using nickel.

The material of a lithium-manganese composite oxide ($LiMn_2O_4$) is cheap. Further, a lithium-manganese composite oxide has safety about thermal stability, in particular, excellent safety about ignition and the like and therefore can be said to be a promising alternative material to a lithium-cobalt composite oxide ($LiCoO_2$). However, a lithium-manganese composite oxide has a theoretical capacity which is only about half that of a lithium-cobalt composite oxide ($LiCoO_2$) and therefore is disadvantageously difficult to meet the demand to increase the capacity of lithium-ion secondary batteries, which has been raised year by year. Another disadvantage of a lithium-manganese composite oxide is that at 45° C. or more, its self-discharge is significant and therefore reduces the charge/discharge life.

On the other hand, a lithium-nickel composite oxide ($LiNiO_2$) has approximately the same theoretical capacity as a lithium-cobalt composite oxide ($LiCoO_2$) and supplies a somewhat lower battery voltage than a lithium-cobalt composite oxide. For this reason, a lithium-nickel composite oxide is less likely to be decomposed due to the oxidation of an electrolyte solution and is expected to have a higher capacity and therefore is actively being developed. However, a lithium-ion secondary battery produced using a lithium-nickel composite oxide purely formed of nickel alone as a positive electrode active material without replacing nickel with another element has lower cycle characteristics than a lithium-cobalt composite oxide. Further, when such a lithium-ion secondary battery is used or stored in a high-temperature environment, it disadvantageously tends to impair battery performance. Another disadvantage of a lithium-nickel composite oxide is that when it is left alone in a high-temperature environment with the battery fully charged, it releases oxygen at lower temperature compared to a cobalt-based composite oxide.

To eliminate these disadvantages, there has been considered the addition of niobium, which is an element having a higher valence than nickel, to a lithium-nickel composite oxide. For example, Patent Literature 1 proposes the following lithium-transition metal composite oxide in order to improve thermal stability when a short-circuit occurs in a positive electrode active material: the lithium transition metal composite oxide consists of particles having a composition including at least two or more compounds consisting of lithium, nickel, cobalt, element M, niobium, and oxygen represented by $Li_aNi_{1-x-y-z}Co_xM_yNb_zO_b$ where M is one or more elements consisting of Mn, Fe, and Al; $1.0 \leq a \leq 1.1$; $0.1 \leq x \leq 0.3$; $0 \leq y \leq 0.1$; $0.01 \leq z \leq 0.05$; and $2 \leq b \leq 2.2$; the particles are approximately spherical, and an approximately spherical shell layer containing at least one or more compounds having a higher niobium concentration than the above composition are present near or inside the surfaces of the particles; and a and β simultaneously satisfy conditions $80 \leq \alpha \leq 150$ and $0.15 \leq \beta \leq 0.20$, respectively, where α represents the discharge capacity [mAh/g] in a range of 2 V to 1.5 V indicated by the potential of the positive electrode at the initial discharge; and β represents the half-width [deg] of the (003) surface of the layered crystal structure in X-ray diffraction.

Patent Literature 2 proposes the following lithium-transition metal composite oxide in order to improve the thermal stability of a positive electrode active material and to increase the charge/discharge capacity: the lithium-transition metal composite oxide is represented by $Li_{1+z}Ni_{1-x-y}Co_xNb_yO_z$ where $0.10 \leq x \leq 0.21$; $0.01 \leq y \leq 0.08$; and $-0.05 \leq z \leq 0.10$; and the standard deviation of the intensity ratio of the peak intensity $I_{Nb}$ of the L line of Nb to the peak intensity $I_{Ni}$ of the L line of Ni measured by an energy dispersive method is within ½ of the average value of the intensity ratio $I_{Nb}/I_{Ni}$.

Patent Literature 3 proposes the following lithium-transition metal composite oxide in order to obtain a positive electrode active material that has a large capacity and has higher thermal stability at the time of charge: the lithium-transition metal composite oxide is represented by a composition formula $Li_xNi_aMn_bCo_cM1_dM2_eO_2$ where M1 is at least one or more elements selected from the group consisting of Al, Ti, and Mg; M2 is at least one or more elements selected from the group consisting of Mo, W, and Nb; $0.2 \leq x \leq 1.2$; $0.6 \leq a \leq 0.8$; $0.05 \leq b \leq 0.3$; $0.05 \leq c \leq 0.3$; $0.02 \leq d \leq 0.04$; $0.02 \leq e \leq 0.06$; and $a+b+c+d+e=1.0$.

Patent Literature 4 proposes the following lithium-transition metal composite oxide in order to achieve both the charge/discharge capacity characteristics and safety of a lithium-ion secondary battery and to suppress the degradation of cycle characteristics: the lithium-transition metal composite oxide has a structure in which a lithium composite oxide represented by $Li_xNi_{(1-y-z-a)}Co_yMn_zM_aO_2$ where M is at least one element selected from the group consisting of Fe, V, Cr, Ti, Mg, Al, Ca, Nb, and Zr; and x, y, and z are $1.0 \leq x \leq 1.10$, $0.45 \leq y+z \leq 0.7$, and $0.2 \leq z \leq 0.5$; and $0 \leq a \leq 0.02$ is coated with a substance A which is a compound consisting of at least one element selected from the group consisting of Ti, Sn, Mg, Zr, Al, Nb, and Zn.

Patent Literature 5 proposes the following lithium-transition metal composite oxide in order to obtain an positive electrode active material having excellent thermal stability and a high charge/discharge capacity: the lithium-transition metal composite oxide is represented by $Li_{1+z}Ni_{1-x-y}Co_x$-$M_yO_2$ where x, y, z satisfy conditions $0.10 \leq x \leq 0.21$, $0.015 \leq y \leq 0.08$, and $-0.05 \leq z \leq 0.10$; and M consists of at least two elements selected from the group consisting of Al, Mn, Nb, and Mo, which have higher affinity with oxygen than nickel, and the average valence number of M exceeds 3; and impregnation with, or adherence of, two M is performed in the production process.

The demand to increase the capacity of small secondary batteries for portable electronic devices and the like has been increased year by year. The trend to use lithium-ion secondary batteries as large secondary batteries has grown. Also, there is a strong demand to use lithium-ion secondary batteries as power supplies for hybrid vehicles and electric vehicles or as stationary storage batteries for power storage. Further, these batteries are required to increase life, and it is important that these batteries have excellent cycle characteristics. For such uses, positive electrode active materials are required to have a higher charge/discharge capacity and to further improve thermal stability and cycle characteristics.

CITATION LIST

Patent Literature

[Patent Literature 1] Japanese Unexamined Patent Application Publication No. 2002-151071
[Patent Literature 2] Japanese Unexamined Patent Application Publication No. 2006-147500
[Patent Literature 3] Japanese Unexamined Patent Application Publication No. 2012-014887
[Patent Literature 4] Japanese Unexamined Patent Application Publication No. 2008-153017
[Patent Literature 5] Japanese Unexamined Patent Application Publication No. 2008-181839

SUMMARY OF INVENTION

Technical Problem

The proposals disclosed in Patent Literatures 1 to 5 are intended to improve both the thermal stability and charge/discharge capacity of a positive electrode active material. However, these proposals have the following problems: the addition of a small amount of niobium to a lithium-transition metal composite oxide results in a high charge/discharge capacity but fails to obtain sufficient thermal stability; and the addition of a large amount of niobium to a lithium-transition metal composite oxide results in good thermal stability but fails to ensure a sufficient charge/discharge capacity. Accordingly, there is a demand to achieve both better thermal stability and a higher charge/discharge capacity.

The present invention has been made in view of the foregoing, and an object thereof is to provide a positive electrode active material for nonaqueous electrolyte secondary batteries that has both better thermal stability and a higher charge/discharge capacity, as well as has excellent cycle characteristics and an easy and safe production method suitable for the industrial production thereof, and an nonaqueous electrolyte secondary battery using the positive electrode active material.

Solution to Problem

To achieve both good thermal stability and a high charge/discharge capacity, the present inventors intensively studied a method for adding niobium to a lithium-transition metal composite oxide. Then, the inventors found that a positive electrode active material produced using a production method including mixing a nickel-containing hydroxide having a particular composition, a lithium compound, and a niobium compound having a particular particle diameter and firing the mixture contained niobium uniformly and had good thermal stability and a high discharge capacity, as well as had improved cycle characteristics, and completed the present invention.

Specifically, the present invention provides a method for producing a positive electrode active material for nonaqueous electrolyte secondary batteries. The positive electrode active material includes a lithium-transition metal composite oxide represented by a general formula $Li_dNi_{1-a-b-c}CO_aM_b$-$Nb_cO_2$ where $0.03 \leq a \leq 0.35$; $0 \leq b \leq 0.10$; $0.001 \leq c \leq 0.05$; $0.95 \leq d \leq 1.20$; and M is at least one element selected from Mn, V, Mg, Ti, and Al and consists of porous particles. The method includes a crystallization step of adding an alkaline aqueous solution to a mixed aqueous solution containing at least nickel and cobalt for crystallization to obtain a nickel-containing hydroxide represented by a general formula $Ni_{1-a'-b'}CO_{a'}M_{b'}(OH)_2$ where $0.03 \leq a' \leq 0.35$; $0 \leq b' \leq 0.10$; and M is at least one element selected from Mn, V, Mg, Ti, and Al, a mixing step of mixing the nickel-containing hydroxide, a lithium compound, and a niobium compound having an average particle diameter of 0.1 to 10 μm to obtain a lithium mixture, and a firing step of firing the lithium mixture in an oxidative atmosphere at 700 to 840° C. to obtain the lithium-transition metal composite oxide.

The crystallization step may include adding the alkaline aqueous solution to the mixed aqueous solution containing at least nickel and cobalt for crystallization and then coating a resulting precipitation with M to obtain the nickel-containing hydroxide.

Preferably, the niobium compound is niobic acid or niobium oxide.

The method may further include a heat treatment step of, prior to the mixing step, heat-treating the nickel-containing hydroxide at a temperature of 105 to 800° C. The mixing step may include mixing a nickel-containing hydroxide and/or a nickel-containing oxide obtained in the heat treatment step, the lithium compound, and the niobium compound to obtain a lithium mixture.

Preferably, the lithium compound is lithium hydroxide. More preferably, the lithium hydroxide is anhydrous lithium hydroxide having a moisture content of 5 mass % or less.

Preferably, the method further includes a drying step of, prior to the firing step, drying the lithium mixture obtained in the mixing step so that lithium hydroxide in the lithium mixture becomes anhydrous lithium hydroxide having a moisture content of 5 mass % or less.

Preferably, the method may further include a water washing step of, after the firing step, adding the lithium-transition metal composite oxide to water at a ratio of 100 to 2000 g of the lithium-transition metal composite oxide to 1 L of water to form a slurry and then washing the slurry with water.

The present invention also provides a positive electrode active material for nonaqueous electrolyte secondary batteries. The positive electrode active material includes a lithium-transition metal composite oxide represented by a general formula $Li_dNi_{1-a-b-c}Co_aM_bNb_cO_2$ where $0.03 \le a \le 0.35$; $0 \le b \le 0.10$; $0.001 \le c \le 0.05$; $0.95 \le d \le 1.20$; and M is at least one element selected from Mn, V, Mg, Ti, and Al and consists of particles of polycrystalline structure. A specific surface area of the positive electrode active material is 0.9 to 4.0 m²/g, and a content of alkali metals other than lithium is 20 mass ppm or less.

Preferably, a crystallite diameter of the positive electrode active material is 10 to 180 nm.

Preferably, a maximum diameter of a niobium compound in the particles of the positive electrode active material observed by EDX measurement using a transmission electron microscope is 200 nm or less.

Preferably, a sulfate group content of the positive electrode active material is 0.2 mass % or less. Preferably, the positive electrode active material has a porous structure.

The present invention also provides a nonaqueous electrolyte secondary battery, wherein any one of the above positive electrode active materials for nonaqueous electrolyte secondary batteries is used as a positive electrode.

Advantageous Effects of the Invention

According to the method for producing a positive electrode active material for nonaqueous electrolyte secondary batteries of the present invention, there can be obtained a positive electrode active material for nonaqueous electrolyte secondary batteries that has both better thermal stability and a higher charge/discharge capacity, as well as has excellent cycle characteristics. Further, the production method of the present invention is easy and safe and is suitable for industrial-scale production and therefore is industrially very useful in terms of cost. Further, by using the produced positive electrode active material, there can be provided a nonaqueous electrolyte secondary battery having high safety and a high battery capacity, as well as long life.

BRIEF DESCRIPTION OF THE DRAWINGS

FIG. 1 is a sectional view of a coin battery used to evaluate a battery.

DESCRIPTION OF EMBODIMENTS

1. Method for Producing Positive Electrode Active Material for Nonaqueous Electrolyte Secondary Batteries A method for producing a positive electrode active material for nonaqueous electrolyte secondary batteries of the present embodiment includes (A) a crystallization step of adding an alkaline aqueous solution to a mixed aqueous solution containing at least nickel and cobalt for crystallization to obtain a nickel-containing hydroxide, (C) a mixing step of mixing the nickel-containing hydroxide, a lithium compound, and a niobium compound having an average particle diameter of 0.1 to 10 μm to obtain a lithium mixture, and (D) a firing step of firing the lithium mixture at 700 to 840° C. in an oxidative atmosphere to obtain a lithium-transition metal composite oxide.

The method may further include (E) a water washing step of, after (D) the firing step, adding the lithium-transition metal composite oxide to water at a ratio of 100 to 2000 g of the lithium-transition metal composite oxide to 1 L of water to form a slurry and washing the slurry with water.

The method may also further include (B) a heat-treatment step of, prior to (C) the mixing step, heat-treating the nickel-containing hydroxide at a temperature of 105 to 800° C.

The respective production steps will be described in detail below.

(A) Crystallization Step

The nickel-containing hydroxide obtained in this step is represented by a general formula $Ni_{1-a'-b'}Co_{a'}M_{b'}(OH)_2$ where a' represents the cobalt content and is $0.03 \le a' \le 0.35$, preferably $0.0 \le a' \le 0.35$, more preferably $0.07 \le a' \le 0.20$; M is at least one element selected from Mn, V, Mg, Ti, and Al; and b' represents the content of element M and is $0 \le b' \le 0.10$, preferably $0.01 \le b' \le 0.07$. Preferably, the nickel-containing hydroxide consists of secondary particles consisting of primary particles.

The nickel-containing hydroxide is obtained by adding an alkaline aqueous solution to a mixed aqueous solution containing at least nickel (Ni) and cobalt (Co) to cause crystallization. Any method may be used to produce a nickel-containing hydroxide represented by the above general formula. For example, the following method may be used.

First, an alkaline aqueous solution is added to a mixed aqueous solution containing at least nickel and cobalt in a reaction tank to obtain a reaction aqueous solution. Then, the reaction aqueous solution is stirred at a constant speed to control pH. Thus, the reaction aqueous solution is crystallized, that is, a nickel-containing hydroxide is coprecipitated in the reaction tank.

The mixed aqueous solution containing at least nickel and cobalt may be a sulfate solution, nitrate solution, or chloride solution of nickel and cobalt. The composition ratio among the metal elements contained in the mixed aqueous solution serves as the composition ratio among the metal elements contained in the obtained nickel-containing hydroxide. Accordingly, the composition ratio among the metal elements in the mixed aqueous solution can be adjusted in order to obtain the target composition ratio among the metal elements in the nickel-containing hydroxide.

The alkaline aqueous solution is, for example, sodium hydroxide or potassium hydroxide, but not limited thereto.

Along with the alkaline aqueous solution, a complexing agent may be added to the mixed aqueous solution.

The complexing agent may be of any type as long as it can be bonded to nickel ions and cobalt ions in the aqueous solution to form complexes. For example, the complexing agent may be an ammonium ion donor. Specific examples of the ammonium ion donor include ammonia, ammonium sulfate, ammonium chloride, ammonium carbonate, and ammonium fluoride.

If the complexing agent is not used, the temperature of the reaction aqueous solution is preferably in a range of above 60° C. and 80° C. or below, and the pH of the reaction aqueous solution is preferably 10 to 11 (on a 25° C. basis) in the above temperature range.

If the pH of the reaction aqueous solution is above 11 in the above temperature range, the nickel-containing hydroxide may be coprecipitated in the form of less-filterable, small particles, that is, spherical particles may not be obtained. On the other hand, if the pH of the reaction aqueous solution is below 10, the nickel-containing hydroxide may be formed at a significantly low speed; Ni may remain in the filtrate; the amount of Ni precipitated may deviate from the target amount; and a nickel-containing hydroxide having the target composition ratio may not be obtained.

When the temperature of the reaction aqueous solution is in the above range, the solubility of nickel is increased. Thus, there can be avoided a phenomenon in which the amount of Ni precipitated deviates from the target amount and thus prevents coprecipitation. On the other hand, if the temperature of the reaction aqueous solution is above 80° C., a large amount of water may evaporate, thereby increasing the slurry concentration and reducing the solubility of Ni. Further, crystals such as sodium sulfate may occur in the filtrate and thus the impurity concentration may be increased. As a result, the charge/discharge capacity of the positive electrode material may be reduced.

If an ammonium ion donor such as ammonia is used as a complexing agent, the solubility of Ni is increased. For this reason, the pH of the reaction aqueous solution is preferably 10 to 12.5, and the temperature is preferably 50 to 80° C.

The ammonia concentration of the reaction aqueous solution is preferably maintained at a constant value in a range of 3 to 25 g/L. If the ammonia concentration is below 3 g/L, the solubility of the metal ions cannot be maintained at a constant value. For this reason, tabular hydroxide primary particles having uniform shapes and particle diameters are not formed, and gel-like nuclei tend to occur. Accordingly, the particle size distribution tends to be expanded. On the other hand, if the ammonia concentration is above 25 g/L, the solubility of the metal ions would be increased excessively, and a larger amount of metal ions would remain in the reaction aqueous solution. Thus, a composition deviation or the like is more likely to occur. Further, if the ammonia concentration varies, the solubility of the metal ions varies as well, thereby failing to form uniform hydroxide particles. Accordingly, the ammonia concentration is preferably maintained at a constant value. For example, the ammonia concentration is preferably maintained at the desired concentration in an upper limit-lower limit width of 5 g/L or so.

After the inside of the reaction layer becomes a steady state, a precipitate is collected, filtered, and washed with water to obtain a nickel-containing hydroxide. Alternatively, a nickel-containing hydroxide may be obtained by continuously supplying a mixed aqueous solution, an alkaline aqueous solution, and optionally an aqueous solution containing an ammonium ion donor and then collecting, filtering, and water-washing a precipitate overflowing the reaction tank.

The nickel-containing hydroxide obtained in the crystallization step is preferably sufficiently washed with water in order to reduce the amount of the remaining impurities, particularly, alkali metals such as sodium.

Optionally, at least one additive element M selected from Mn, V, Mg, Ti, and Al may be mixed with the nickel-containing hydroxide. The additive element M can improve thermal stability, storage characteristics, battery characteristics, and the like.

Any method may be used to mix the additive element M, and various known conventional methods may be used. For example, a nickel-containing hydroxide (containing the additive element M) may be obtained by adding an aqueous solution containing the additive element M to a mixed aqueous solution containing nickel and cobalt to cause coprecipitation. This method can increase the productivity of the crystallization step.

Examples of the aqueous solution containing the additive element M include aqueous solutions containing aluminum sulfate, sodium aluminate, titanium sulfate, ammonium peroxotitanic acid, titanium potassium oxalate, manganese sulfate, magnesium sulfate, magnesium chloride, vanadium sulfate, and ammonium vanadate, respectively.

To optimize the crystallization conditions to easily control the composition ratio, there may be used a method including adding an alkaline aqueous solution to a mixed aqueous solution containing nickel and cobalt to cause crystallization and then coating the resulting precipitation with the additive element M.

Any method, including known methods, may be used to coat the precipitation with the additive element M. Examples include 1) a method including adding an alkaline aqueous solution to a mixed aqueous solution containing nickel and cobalt (except for the additive element M) to cause crystallization and coating the resulting nickel-containing hydroxide with the additive element M and 2) a method including preparing a mixed aqueous solution containing nickel, cobalt, and part of the additive element M, coprecipitating a nickel-containing hydroxide (containing the additive element M), and coating the coprecipitation with the additive element M to adjust the content of M.

An example of the method for coating the nickel-containing hydroxide with the additive element M will be described below.

The nickel-containing hydroxide is dispersed in pure water to form a slurry. A solution containing the amount of M corresponding to the target amount of coating is mixed with the slurry, and acid is added dropwise to adjust the pH to a predetermined pH. This acid is, for example, sulfuric acid, hydrochloric acid, or nitric acid. After mixing for a predetermined time, the mixture is filtered and dried to obtain a nickel-containing hydroxide coated with M. Other methods for coating with M include a method of spray-drying a solution containing a compound of M and a method of impregnating with such a solution.

Note that in the present embodiment, a solid-phase niobium compound is added in the mixing step and therefore niobium coating is not performed.

(B) Heat Treatment Step

While the nickel-containing hydroxide obtained in the crystallization step can be used in the mixing step as it is, the method may include a heat treatment step of, prior to the mixing step, heat-treating the nickel-containing hydroxide. By removing moisture contained in the nickel-containing hydroxide in the heat treatment step, moisture which would remain in the nickel-containing hydroxide in the lithium mixture in the firing step (to be discussed later) is sufficiently reduced. Thus, it is possible to prevent a variation in the ratio of the number of atoms of metals (Me) other than lithium to the number of atoms of lithium (Li) (Li/Me) in the lithium-transition metal composite oxide obtained in the firing step. A compound containing element M may be added in this heat treatment step.

In the heat treatment step, it is only necessary to heat the nickel-containing hydroxide to a temperature at which the residual moisture therein is removed, and the temperature is preferably to 105 to 800° C. For example, the residual moisture can be removed by heating the nickel-containing hydroxide to 105° C. or above. Note that if the heating temperature is below 105° C., it would take a long time to remove the residual moisture, which would be industrially inappropriate; if the heating temperature is above 800° C., particles that have been converted into a composite oxide may be sintered and agglomerated. To convert the nickel-containing hydroxide into a nickel-containing oxide, the nickel-containing hydroxide is preferably heated to a temperature of 350 to 800° C.

To further reduce the variation in Li/Me, a nickel-containing oxide may be obtained by converting the composite hydroxide in the nickel-containing hydroxide into a composite oxide. However, all the nickel-containing hydroxide need not necessarily be converted into a nickel-containing oxide, since it is only necessary to remove moisture to the extent that a variation does not occur in Li/Me of the positive electrode active material.

Heat treatment may be performed in any type of atmosphere, but is preferably performed in an airflow, in which heat treatment can be easily performed. Also, heat treatment may be performed for any length of time, but is performed preferably at least 1 hour or more, more preferably 5 to 15 hours. This is because heat treatment for less than 1 hour may not sufficiently remove the residual moisture in the composite hydroxide. Further, heat treatment may be performed using any type of equipment as long as the equipment can heat the composite hydroxide in an airflow. Preferred equipment includes a blower dryer and an electric furnace, which generates no gas.

(C) Mixing Step

The mixing step is a step of mixing the nickel-containing hydroxide obtained in the crystallization step, a niobium compound, and a lithium compound to obtain a lithium mixture. Note that if heat treatment is performed after the crystallization step, the resulting nickel-containing oxide and/or nickel-containing hydroxide, a niobium compound, and a lithium compound are mixed to obtain a lithium mixture.

The present embodiment is characterized in that in the mixing step, a solid-phase niobium compound having a particular particle diameter is added to and mixed with the nickel-containing hydroxide and a lithium compound. As a typical method for mixing niobium with an active material, there has been used a method including adding niobium to a nickel-containing hydroxide using a coating method, such as wet coprecipitation/coating or spry drying, then mixing a lithium compound, and firing the mixture (e.g., Patent Literature 5). However, coating methods, such as wet coprecipitation/coating and spray drying, have problems, such as an increase in man-hours or cost and safety, as described above, as well as have a problem that impurities derived from a solution for dissolving niobium (e.g., a KOH solution, an oxalic acid solution) or impurities derived from a solution for adjusting pH during coating (e.g., sulfuric acid, hydrochloric acid, nitric acid) remain along with niobium used for coating.

As another method for adding niobium, there is known a method including a crystallization step of adding a niobium-containing solution to a mixed solution containing nickel to coprecipitate a nickel-containing hydroxide (e.g., Patent Literatures 1 to 3). However, when a niobium-containing solution is added in the crystallization step, a fine niobium hydroxide is formed and thus the resulting nickel-containing hydroxide takes the form of secondary particles, which are the agglomeration of primary particles, which are finer than the secondary particles. Thus, disadvantageously, the amount of impurities in the secondary particles, including alkali metals, such as potassium and sodium, and sulfuric acid anions, is increased, and such impurities are difficult to reduce even when performing washing after crystallization. Further, the primary particles of this nickel-containing hydroxide are fine and have low crystallinity and thus a positive electrode active material having a very small crystallite diameter is obtained after the firing step.

On the other hand, the mixing step of the present embodiment, in which a solid-phase niobium compound is added, is a step that does not require a chemical solution or the like and has a low load and excellent productivity compared to the wet step, in which niobium is coprecipitated or used for coating. Further, it is necessary to control pH in the wet step, in which niobium is coprecipitated or used for coating, and niobium may not be added in the target form or amount in some cases. On the other hand, the addition of a solid-phase niobium compound increases the stability of quality. Further, by adding a solid-phase niobium compound that does not substantially contain any alkali metal other than lithium (e.g., sodium, potassium), sulfur, or the like, it is possible to reduce the amount of impurities contained in the lithium-transition metal composite oxide, such as alkali metals other than lithium, or sulfate.

Examples of the niobium compound include, but not limited to, niobic acid, niobium oxide, niobium nitrate, niobium pentachloride, and niobium nitrate. Among these, niobic acid and niobium oxide are more available and are preferred in reducing impurities in the lithium-transition metal composite oxide. Note that the inclusion of impurities degrades battery characteristics, such as thermal stability, charge/discharge capacity, and cycle characteristics.

When a solid-phase niobium compound is added, the reactivity varies with the particle diameter. For this reason, it is an important factor to control the particle diameter of a niobium compound to be added. In the present embodiment, the average particle diameter of the niobium compound is 0.1 to 10 μm, preferably 0.5 to 8 μm, more preferably 0.1 to 3.0 μm, even more preferably 0.1 to 1.0 μm. If the average particle diameter is below 0.1 μm, the powder would be very difficult to handle and, for example, there would occur a problem that in the mixing step or firing step, the niobium compound is scattered, resulting in an active material that does not have the target composition. On the other hand, if the average particle diameter is above 10 μm, there would occur a problem that the reactivity during the firing step is reduced; niobium is not sufficiently dispersed in the lithium-transition metal composite oxide; niobium is not uniformly distributed in the lithium-transition metal composite oxide after the firing step; and thermal stability cannot be ensured. Note that the average particle diameter is a mean volume diameter (MV) measured by laser diffraction/scattering.

Methods for adjusting the average particle diameter of the niobium compound to within the above range include a method of grinding the niobium compound using any type of mill, including a ball mill, a planet ball mill, a jet mill/nano-jet mill, a bead mill, and a pin mill, to obtain a predetermined particle diameter. Optionally, the particles may be classified using a wet classifier or sieve.

By adding a solid-phase niobium compound having the above average particle diameter, the resulting lithium-transition metal composite oxide seems to have a porous structure. Specifically, from the fact that the nickel-containing hydroxide obtained in the crystallization step consists of secondary particles, which are the agglomeration of primary particles; and when niobium is dispersed from the secondary particle surfaces in the firing step, the primary particles react at non-uniform speeds, it is inferred that the primary particles shrink non-uniformly and thus form small gaps and result in a porous structure, which is preferable for a positive electrode active material. However, details are unknown.

The lithium compound used in the mixing step may be of any type as long as it does not contain sulfate groups as components. For example, a hydroxide, carbonate, oxide, or the like of lithium may be used. Among these, lithium hydroxide is preferable as the lithium compound. In the present specification, the term "lithium hydroxide" includes hydrates and non-hydrates.

More preferably, 1) the lithium component used in the mixing step is anhydrous lithium hydroxide having a moisture content of 5 mass % or less, or 2) prior to the firing step, the obtained lithium mixture is dried so that the lithium compound in the lithium mixture becomes anhydrous lithium hydroxide having a moisture content of 5 mass % or less. By using anhydrous lithium hydroxide having a moisture content of 5 mass % or less, the lithium compound, nickel-containing hydroxide, and niobium compound react with each other in solid phase with higher reactivity in the firing step.

Further, the quality variation in the atomic number ratio of lithium (Li) to metals other than lithium (Me) in the produced positive electrode active material (hereafter referred to as "Li/Me") is reduced. Thus, it is possible to more stably obtain a positive electrode active material having good charge/discharge capacity or thermal stability.

Any method may be used to prepare anhydrous lithium hydroxide having a moisture content in the above range. For example, such anhydrous lithium hydroxide may be prepared by vacuum-drying lithium hydroxide monohydrate or firing it in the air. Among others, vacuum drying is preferred in terms of the number of steps or quality.

Assuming that the moisture content of lithium hydroxide monohydrate is 100% and the moisture content of anhydrous lithium hydroxide obtained by vacuum-drying lithium hydroxide at 200° C. for 8 hours is 0%, the moisture content of the anhydrous lithium hydroxide can be calculated from the relative percentage (mass).

If the lithium compound in the lithium mixture is converted into anhydrous lithium hydroxide, for example, anhydrous lithium hydroxide having a moisture content of 5 mass % or less may be obtained by, in a drying step, vacuum-drying or air-firing the lithium mixture obtained by mixing the nickel-containing hydroxide, lithium hydroxide, and niobium compound. In this drying step, the lithium mixture is preferably dried at 150 to 250° C. for 10 to 20 hours. The moisture content of the anhydrous lithium hydroxide obtained in the drying step may be obtained as follows: the lithium hydroxide used in the mixing step is dried on conditions similar to those in the drying step; the moisture content of the resulting lithium hydroxide is measured; and the measured value is used as the moisture content of the anhydrous lithium hydroxide obtained in the drying step.

Alternatively, the lithium compound in the lithium mixture may be converted into anhydrous lithium hydroxide having a moisture content of 5 mass % or less by drying the lithium mixture obtained by mixing the nickel-containing hydroxide, lithium hydroxide, and niobium compound, in the furnace for performing the firing step, with a temperature and time similar to those in the above drying step.

The average particle diameter of the nickel-containing hydroxide used in the mixing step is preferably about 5 to 20 µm, more preferably 10 to 15 µm. The particle diameter of the nickel-containing hydroxide can be controlled by adjusting the crystallization conditions or the like. Note that the average particle diameter is a mean volume diameter (MV) measured by laser diffraction/scattering.

The nickel-containing hydroxide, lithium compound, and niobium compound are mixed in such a manner that Li/Me in the lithium mixture is 0.95 to 1.20. That is, these compounds are mixed in such a manner that Li/Me in the lithium mixture is the same as Li/Me in the positive electrode active material. The reason is that Li/Me does not vary between before and after the firing step and therefore Li/Me after the mixing step becomes Li/Me in the positive electrode active material.

If a water washing step (to be discussed later) is performed after the firing step, Li/Me is reduced by water washing. Accordingly, if water washing is performed, it is preferred to mix the nickel-containing hydroxide, lithium compound and niobium compound in anticipation of the reduction in Li/Me. Although it depends on the firing conditions or water-washing conditions, the reduction in Li/Me due to water washing is about 0.05 to 0.1. The reduction can be determined by producing a small amount of positive electrode active material as a preliminary test.

A typical mixer can be used to mix the nickel-containing hydroxide, lithium compound, and niobium compound. For example, a shaker mixer, Lodige mixer, Julia mixer, and V-blender can be used. The mixing conditions may be any conditions as long as the nickel-containing hydroxide, lithium compound, and niobium compound are sufficiently mixed in such a manner that the shape of the nickel-containing hydroxide particles or the like is not broken.

Preferably, the lithium mixture is sufficiently mixed prior to firing. If mixing is not sufficient, there may occur a problem such as variations in Li/Me among individual particles and thus a failure to obtain sufficient battery characteristics.

(D) Firing Step

The firing step is a step of firing the lithium mixture obtained in the mixing step in an oxidative atmosphere at 700 to 840° C., preferably 700 to 820° C., more preferably 700 to 800° C. to obtain a lithium-transition metal composite oxide.

The firing temperature is 700 to 840° C., preferably 700 to 820° C., more preferably 710 to 810° C. in an oxidative atmosphere. If the firing temperature is below 700° C., the following problem occurs: lithium or niobium is not sufficiently dispersed in the nickel-containing hydroxide; excess lithium or unreacted particles remain; a well-organized crystal structure is not formed; and thus sufficient battery characteristics are not obtained. If the firing temperature is above 840° C., intense sintering may occur among the resulting lithium-transition metal composite oxide particles, and abnormal particles may grow. If abnormal particles grow, the following problem occurs: the fired particles may become coarse and fail to maintain the particle form; when a positive electrode active material is formed, the specific surface area may be reduced; the resistance of the positive electrode may be increased, and battery characteristics such as the battery capacity may be degraded.

When the lithium mixture is fired in the firing step, lithium in the lithium compound and niobium in the niobium compound are dispersed in the nickel-containing hydroxide. Thus, a lithium-transition metal composite oxide consisting of polycrystalline particles is formed. At this time, Ni, Co, and additive element M in the lithium mixture preferably form a composite hydroxide (a nickel-containing hydroxide) so that the nickel compound is distributed uniformly. In the lithium compound mixed with the nickel-containing hydroxide, the reaction between lithium and these elements proceeds approximately concurrently with the reaction in which the niobium compound is decomposed and dispersed in the composite hydroxide, and therefore niobium is distributed more uniformly in the lithium-transition metal composite oxide. On the other hand, if Ni, Co, and additive element M form a nickel-containing oxide, the reaction between lithium and these elements proceeds first and thus niobium may not be sufficiently dispersed in the composite hydroxide but rather may be segregated in the lithium-transition metal composite oxide while taking the form of a niobium compound or the like.

The firing time is preferably at least 3 hours or more, more preferably 6 to 24 hours. This is because if the firing time is less than 3 hours, a sufficient amount of lithium-transition metal composite oxide may not be produced. The atmosphere for firing is preferably an oxidative atmosphere, more preferably an atmosphere whose oxygen concentration is 18 to 100 volume %. That is, firing is preferably performed in the air or in an oxygen stream. This is because if the oxygen concentration is below 18 volume %, sufficient oxidation may not occur, and the crystallinity of the lithium-transition metal composite oxide may become insufficient. It is particularly preferable to perform firing in an oxygen stream considering battery characteristics.

In the firing step, the lithium mixture may be calcined at a temperature which is lower than the firing temperature and at which the lithium compound and nickel-containing hydroxide can react with each other, before firing the lithium mixture at a temperature of 700 to 840° C. Owing to the calcination, lithium is sufficiently dispersed in the nickel-containing hydroxide in the lithium mixture, which allows for the production of a uniform lithium-transition metal composite oxide. For example, if lithium hydroxide is used, it is preferred to hold the lithium mixture at a temperature of 400 to 550° C., which is equal to or more than the melting point of lithium hydroxide, for about 1 to 10 hours and then to calcine it.

Any type of furnace may be used for firing as long as the lithium mixture can be fired in the air or in an oxygen stream therein. However, it is preferred to use an electric furnace, which generates no gas, particularly that of batch type or continuous type.

In the lithium-transition metal composite oxide obtained in the firing step, sintering among the particles is suppressed. However, coarse particles may be formed due to weak sintering or agglomeration. In this case, the sintering or agglomeration may be eliminated by cracking to adjust the particle size distribution.

(E) Water Washing Step

The lithium-transition metal composite oxide obtained in the firing step can be used as a positive electrode active material as it is. However, after the firing step, it is preferred to form a slurry by adding the lithium-transition metal composite oxide to water at a ratio of 100 to 2000 g of the lithium-transition metal composite oxide to 1 L of water and then to wash the slurry with water.

By performing the water washing step, it is possible to remove excess lithium on the particle surfaces of the lithium-transition metal composite oxide, to increase the area of the surfaces that can contact an electrolyte solution, and to increase the charge/discharge capacity. Further, it is possible to remove vulnerable portions formed on the particle surfaces, to increase the contact with the electrolyte solution, and to increase the charge/discharge capacity. Excess lithium in a nonaqueous secondary battery generates a gas as a side reaction, which then causes, for example, the expansion of the battery. Accordingly, it is preferred to perform a water washing step to increase safety.

With regard to the concentration of the slurry to be water-washed, the amount (g) of the lithium-transition metal composite oxide with respect to 1 L of water contained in the slurry is preferably 100 to 2000 g. That is, as the slurry concentration is increased, the amount of powder is increased. If the slurry concentration is above 2000 g/L, the viscosity would be very high as well. Accordingly, the slurry would become difficult to stir. Further, since the solution is strongly alkaline, the speed at which the deposit is dissolved may be reduced due to the equivalence. Even when the deposit is peeled, it may be difficult to separate from the powder. On the other hand, if the slurry concentration is too low a concentration of below 100 g/L, a large amount of lithium would be eluted, and the amount of lithium on the surfaces would be reduced. Further, lithium would desorb from the crystal lattice of the positive electrode active material, making the crystal more likely to collapse. Furthermore, the high-pH aqueous solution would absorb carbon dioxide in the air, and lithium carbonate would be reprecipitated.

While any type of water may be used, pure water is preferable. Use of pure water can prevent a reduction in battery performance due to the deposition of impurities on the positive electrode active material.

Further, it is preferable that a smaller amount of water adhere to the particle surfaces when the slurry is separated into solid and liquid. If a large amount of water adheres, lithium dissolved in the solution would be reprecipitated, and a larger amount of lithium would be present on the surfaces of the dried lithium-transition metal composite oxide particles.

In the water washing step, filtration and drying steps are preferably performed after water washing.

Filtration may be performed using a typical method, for example, using a suction filter, filter press, or centrifuge.

Drying after filtration may be performed at any temperature, but is preferably performed at 80 to 350° C. A drying temperature below 80° C. would make slow the drying of the water-washed positive electrode active material. Thus, a gradient may occur between the lithium concentration on the particle surfaces and that inside the particles, resulting in the degradation of battery characteristics. On the other hand, it seems that the state around the surface of the positive electrode active material is extremely close to a stoichiometric ratio, or close to a charged state due to the desorption of a slight amount of lithium. For this reason, a temperature above 350° C. would cause the collapse of the crystal structure close to a charged state, resulting in the degradation of battery characteristics.

The drying time may be any length of time, but is preferably 2 to 24 hours.

2. Positive Electrode Active Material for Nonaqueous Electrolyte Secondary Batteries (1) Composition A positive electrode active material of the present embodiment includes a lithium-transition metal composite oxide represented by a general formula $Li_dNi_{1-a-b-c}Co_aM_b Nb_cO_2$ where M is at least one element selected from Mn, V, Mg, Ti, and Al; $0.03 \leq a \leq 0.35$; $0 \leq b \leq 0.10$; $0.001 \leq c \leq 0.05$; and $0.95 \leq d \leq 1.20$.

In the general formula, a represents the content of cobalt and is $0.035 \leq a \leq 0.35$, preferably $0.05 \leq a \leq 0.35$, more preferably $0.07 \leq a \leq 0.20$, even more preferably $0.10 \leq a \leq 0.20$. Cobalt contributes to an improvement in cycle characteristics. a below 0.03 would result in a failure to obtain sufficient cycle characteristics and a reduction in capacity retention rate; a above 0.35 would result in a significant increase in initial discharge capacity.

In the general formula, b represents the content of M and is 0≤b≤0.10, preferably 0<b≤0.10, more preferably 0.01≤b≤0.07. M is at least one element selected from Mn, V, Mg, Ti, and Al and can be added in order to improve battery characteristics such as cycle characteristics and safety. b above 0.10 would further improve battery characteristics, but would unfavorably significantly reduce the initial discharge capacity. When 0≤b≤0.10, excellent cycle characteristics can be obtained.

In the general formula, c represents the content of niobium and is 0.001≤c≤0.05, preferably 0.002≤c≤0.05, more preferably 0.002≤c≤0.04, even more preferably 0.003≤c≤0.02. Niobium is thought to contribute to suppressing a thermal decomposition reaction caused by the deoxidation of the lithium-transition metal composite oxide. It has an effect of improving safety, as well as has an effect of stabilizing the crystal and thus improving cycle characteristics. c below 0.001, which is an excessively small addition amount, would not sufficiently improve safety. On the other hand, safety is improved in accordance with the amount of niobium added, but c above 0.05 would reduce the crystallinity and reduce the charge/discharge capacity or cycle characteristics.

In the general formula, d represents the mole number ratio (Li/Me) of lithium to metals (Me) other than lithium and is 0.9≤d≤1.20, preferably 0.98≤d≤1.10. d below 0.95 would reduce the charge/discharge capacity. On the other hand, the charge/discharge capacity is increased as d is increased, but d above 1.20 would reduce safety.

The contents of the above components are values measured based on quantitative analysis using inductively coupled plasma (ICP).

(2) Internal Structure

Preferably, the positive electrode active material of the present embodiment includes a lithium-transition metal composite oxide consisting of polycrystalline particles and has a porous structure. In the present specification, the term "porous structure" refers to a structure in which when any cross-section (observation surface) of a particle of the positive electrode active material is observed (at a 5000× magnification) using a scanning electron microscope, multiple gaps in which the length between any two points on the outer edge of each gap is 0.3μ or more are observed on the cross-section.

The maximum length of gaps in a particle in cross-sectional observation using a scanning electron microscope is preferably 50% or less, more preferably 40% or less of the length of the particle cross-section. The gaps are preferably present at least in the grain boundaries. If a positive electrode active material having the above porous structure is used as the positive electrode of a battery, significantly increased particle surfaces can contact an electrolyte solution. Thus, it is possible to compensate for a reduction in charge/discharge capacity caused by the addition of niobium and to obtain sufficient charge/discharge capacity while ensuring safety.

Further, the number of gaps in the cross-sectional observation is obtained with respect to any 20 or more particles; the sum of the gap numbers is divided by the sum of the particle cross-section lengths (μm) of the particles; and the obtained index (hereafter referred to as "the gap count") is preferably 0.2 to 10 units/μm, more preferably 3 to 8 units/μm. As used herein, the term "particle cross-sectional length" refers to the maximum length between any two points on the perimeter of the observation surface of a particle. Note that particles having a mean volume diameter (MV) (to be discussed later) of 20% or less in the positive electrode active material in the cross-sectional observation are removed in a determination whether the positive electrode active material has a porous structure. The reason is that particles having an average particle diameter of 20% or less are small in amount in the positive electrode active material and therefore have a small effect on the charge/discharge capacity and that the observation surface is a cross-section of the particle edge and may not be appropriate in the evaluation of the particles. When the gap count is in the above range, excessive contact with the electrolyte solution is suppressed. Thus, it is possible to obtain a sufficient contact area and a high charge/discharge capacity while suppressing a reduction in thermal stability.

(3) Specific Surface Area

The specific surface area of the positive electrode active material of the present embodiment is 0.9 to 4.0 m$^2$/g, preferably 0.9 to 3.0 m$^2$/g, more preferably 0.9 to 2.8 m=/g, even more preferably 1.0 to 2.8 m$^2$/g, particularly preferably 1.0 to 2.6 m$^2$/g. A specific surface area below 0.9 m$^2$/g would result in a reduction in the particle surfaces that can contact the electrolyte solution and a failure to obtain a sufficient charge/discharge capacity; a specific surface area above 4.0 m$^2$/g would result in an excessive increase in the particle surfaces that can contact the electrolyte solution and thus a reduction in safety. The specific surface area can be set in the above range by adjusting the Li/Me ratio, firing conditions, and water washing conditions.

(4) Impurity Content

In the present embodiment, the content of alkali metals other than lithium in the positive electrode active material is 20 mass ppm or less, preferably 10 mass ppm or less. When c indicating the niobium content is in the above range and the content of alkali metals other than lithium is 20 mass ppm or less, more excellent cycle characteristics can be obtained. If one of the content of alkali metals other than lithium and the amount of niobium added exceeds the corresponding range, good cycle characteristics cannot be obtained. The content of alkali metals other than lithium can be set in the above range by using the above production method, which includes adding solid-phase niobium.

The content of sulfate groups (SO$_4$) in the lithium-transition metal composite oxide is preferably 0.2 mass % or less, more preferably 0.01 to 0.2 mass %, even more preferably 0.02 to 0.1 mass %. When the content of the sulfate groups is 0.2 mass % or less, more excellent cycle characteristics can be obtained.

At least some of the sulfate groups contained in the lithium-transition metal composite oxide are derived from a metal salt of nickel, cobalt, or the like used in the crystallization step. For example, if sulfate is used as a metal salt, the content of the sulfate groups tends to be increased as the pH of the reaction solution is reduced. For this reason, the sulfate group content can be set in the above range by adjusting the pH properly and performing water washing sufficiently. Use of sulfate as a metal salt in the crystallization step is effective in increasing the metal concentration of the aqueous solution to increase productivity, as well as in reducing the environmental load.

In the present embodiment, a solid-phase niobium compound is added in (C) the mixing step. Thus, it is possible to prevent the entry of sulfate groups when niobium is used for wet coating and thus to reduce the sulfate group content. The sulfate group content can also be reduced by removing a foreign sulfur compound from the niobium compound used in (C) the mixing step.

(5) Existence Form of Niobium

As the existence form of niobium in the positive electrode active material of the present embodiment, niobium may be solidly dissolved in the lithium-transition metal composite oxide. Niobium may also exist in the form of a lithium-niobium composite oxide in the grain boundaries, or on the particle surfaces, of the lithium-transition metal composite oxide. Even in this case, niobium is preferably solidly dissolved. As used herein, the term "solidly dissolved" refers to a state in which when the particles of the lithium-transition metal composite oxide are EDX-measured using a transmission electron microscope, no different phase is observed in the particles. Specifically, the maximum diameter of the niobium compound in the lithium-transition metal composite oxide observed in EDX measurement using a transmission electron microscope is preferably 200 nm or less. By limiting the maximum diameter of the niobium compound to within the above range and thus suppressing the formation of a coarse niobium compound, a high battery capacity can be obtained.

The ratio of the niobium concentration in the grain boundaries to that in the particles is preferably 4 or less, more preferably 3 or less. The ratio of the niobium concentration in the grain boundaries to that in the particles can be obtained from the result of the EDX measurement using the transmission electron microscope. By reducing the niobium concentration ratio, it is possible to increase the thermal decomposition reaction suppression effect even when a small amount of niobium is added.

(6) Crystallite Diameter

In the positive electrode active material of the present invention, the crystallite diameter of the lithium-transition metal composite oxide is preferably 10 to 180 nm, more preferably 10 to 150 nm, even more preferably 50 to 150 nm, particularly preferably 50 to 130 nm. A crystallite diameter below 10 nm would result in an excessive increase in the number of grain boundaries and thus an increase in the resistance of the active material. Thus, a sufficient charge/discharge capacity may not be obtained. On the other hand, a crystallite diameter above 180 nm would result in excessive crystal growth. Thus, there may occur cation mixing, where nickel is mixed into the lithium layer of the lithium-transition metal composite oxide, which is a layered compound, reducing the charge/discharge capacity. The crystallite diameter can be limited to within the above range by adjusting the crystallization conditions, firing temperature, firing time, or the like. For example, the crystallite diameter can be increased by adjusting the crystallization conditions to increase the crystallinity of the nickel-containing hydroxide. The crystallite diameter can also be increased by increasing the firing temperature. The crystallite diameter is a value calculated from the peak of the (003) surface in X-ray diffraction (XRD).

(7) Average Particle Diameter

Assuming that the average particle diameter is D50, which is a 50% diameter in a volume integrated particle size distribution measured by laser scattering, the average particle diameter of the positive electrode active material of the present embodiment is preferably 5 to 20 µm, more preferably 10 to 15 µm. An average particle diameter below 5 µm may result in a reduction in the packing density when the positive electrode active material is used as the positive electrode of a battery. Thus, a sufficient charge/discharge capacity per unit volume may not be obtained. On the other hand, an average particle diameter above 20 µm may result in a failure to obtain a sufficient area that contacts the electrolyte solution and thus a reduction in charge/discharge capacity.

3. Nonaqueous Electrolyte Secondary Battery

The elements of a nonaqueous electrolyte secondary battery of an embodiment of the present invention will be described in detail. Nonaqueous electrolyte secondary batteries of the present invention include components similar to those of a typical lithium-ion secondary battery, such as a positive electrode, a negative electrode, and a nonaqueous electrolyte solution. The embodiment described below is only illustrative, and nonaqueous electrolyte secondary batteries of the present invention include the embodiment below, as well as forms obtained by making various changes or modifications thereto on the basis of the knowledge of those skilled in the art. Nonaqueous electrolyte secondary batteries of the present invention may be used for any applications.

(1) Positive Electrode

A positive electrode mixture material for forming a positive electrode and materials included in the mixture material will be described. The powdery positive electrode active material of the present invention, a conductive material, and a binder are mixed. Optionally, activated carbon and a solvent for viscosity adjustment or other purposes are added and kneaded to prepare a positive electrode mixture material paste. The mixing ratio among the components of the positive electrode mixture material may be adjusted properly in accordance with the required secondary battery performance.

For example, the contents of the positive electrode active material, conductive material, and binder may be 60 to 95% by mass, 1 to 20% by mass, and 1 to 20% by mass, respectively, with respect to the entire mass of the solid content of the positive electrode mixture material except for the solvent of 100% by mass, as in the positive electrode of a typical lithium secondary battery.

The prepared positive electrode mixture material paste is applied to a surface of a collector formed of an aluminum foil and dried to scatter the solvent. Optionally, the collector may be pressed using a roll press or the like to increase the electrode density. In this way, a sheet-shaped positive electrode can be produced. The sheet-shaped positive electrode may be used to produce the target battery, for example, by cutting it into a size suitable for the battery. The above positive electrode production method is only illustrative, and other methods may be used.

Examples of the conductive material include carbon black-based materials, such as graphite (natural graphite, artificial graphite, expanded graphite, etc.), acetylene black, and Ketjen black.

Examples of the binder include, but not limited to, fluorine-containing resins, such as polyvinylidene fluoride, polytetrafluoroethylene, ethylene propylene diene rubber, and fluororubber, styrene butadiene, cellulose-based resin, polyacrylic acid, polypropylene, and polyethylene.

Optionally, the positive electrode active material, conductive material, and activated carbon are dispersed, and a solvent for dissolving the binder is added to the positive electrode mixture material. Specifically, the solvent may be an organic solvent such as N-methyl-2-pyrrolidone. Further, activated carbon may be added to the positive electrode mixture material to increase the electric double layer capacity.

(2) Negative Electrode

A negative electrode is formed as follows: a binder is mixed with metallic lithium, lithium alloy, or the like or a negative electrode active material which can occlude and desorb lithium ions; an appropriate solvent is added to the mixture to prepare a pasty negative electrode mixture material; the pasty negative electrode mixture material is applied to a surface of a metal-foil collector formed of copper or the like, dried, and optionally compressed to increase the electrode density.

Examples of the negative electrode active material include natural graphite, artificial graphite, a fired body of an organic compound such as phenol resin, and the powder of a carbon material such as coke. As in the positive electrode, the negative electrode binder may be a fluorine-containing resin such as polyvinylidene fluoride, or the like. The solvent for dispersing the active material and binder may be an organic solvent such as N-methyl-2-pyrrolidone.

(3) Separator

A separator is sandwiched between the positive electrode and negative electrode. The separator separates the positive electrode and negative electrode and holds an electrolyte. It may be a thin, porous film formed of polyethylene, polypropylene, or the like.

(4) Nonaqueous Electrolyte Solution

A nonaqueous electrolyte solution is prepared by dissolving a lithium salt serving as a supporting electrolyte in an organic solvent. The organic solvent may be, for example, one or a combination of two or more selected from cyclic carbonates such as ethylene carbonate, propylene carbonate, butylene carbonate, and trifluoropropylene carbonate, chain carbonates such as diethyl carbonate, dimethyl carbonate, ethylmethyl carbonate, and dipropyl carbonate, ether components such as tetrahydrofuran, 2-methyltetrahydrofuran, and dimethoxyethane, sulfur compounds such as ethyl methyl sulfone and butanesultone, phosphorus compounds such as triethyl phosphate and trioctyl phosphate, and the like.

Examples of the supporting electrolyte include $LiPF_6$, $LiBF_4$, $LiClO_4$, $LiAsF_6$, $LiN(CF_3SO_2)_2$, and composite salts thereof.

The nonaqueous electrolyte solution may contain a radical scavenger, a surfactant, a flame retardant, or the like.

(5) Shape and Configuration of Battery

The lithium secondary battery of the present invention including the positive electrode, negative electrode, separator, and nonaqueous electrolyte solution described above can take various shapes, including cylindrical and stacked shapes.

Regardless of the shape of the lithium secondary battery, the positive electrode and negative electrode are stacked with the separator therebetween to form an electrode body, and the electrode body is impregnated with the nonaqueous electrolyte solution. Collection leads or the like are used to connect a positive electrode collector and a positive electrode terminal leading to the outside and to connect a negative electrode collector and a negative electrode terminal leading to the outside. The lithium secondary battery thus configured is hermetically sealed in a battery case, thereby completing the battery.

EXAMPLES

Hereafter, the present invention will be described in more detail using Examples of the present invention and Comparative Examples. However, the present invention is not limited to these Examples.

Example 1

Method for Producing Positive Electrode Active Material (A) Crystallization Step A mixed aqueous solution of nickel sulfate, cobalt sulfate, and a sodium aluminate aqueous solution, 25 mass % of a sodium hydroxide aqueous solution, and 25 mass % of ammonia water were simultaneously charged into a reaction tank in such a manner that the nickel:cobalt:aluminum molar ratio is 81.5:15.0:3.5. The pH in the reaction tank was maintained at 11.8 with respect to a solution temperature of 25° C.; the reaction temperature was maintained at 50° C.; and the ammonia concentration was maintained at 10 g/L. Then, a crystallization reaction produced a precipitation consisting of spherical secondary particles. After the inside of the reaction tank was stabilized, a slurry of the precipitate was collected from an overflow outlet, filtered, water-washed, and then dried to give a nickel-containing hydroxide $[Ni_{0.815}Co_{0.150}Al_{0.035}(OH)_2]$.

(C) Mixing Step

The resulting nickel-containing hydroxide, commercially available lithium hydroxide monohydrate, and niobic acid $(Nb_2O_5 \cdot xH_2O)$ powder obtained by grinding niobic acid using a nano-grinding mill (available from Sunrex-Kogyo Co., Ltd.) so that an average particle diameter of 0.6 μm was obtained were weighed out in such a manner that the target niobium addition amount c' became 0.01 and Li/Me became 1.10. Then, these compounds were sufficiently mixed with intensity such that the shape of the nickel-containing hydroxide was maintained, using a shaker mixer [TURBULA Type T2C available from Willy A. Bachofen AG (WAB)] to give a lithium mixture.

(E) Firing Step

The resulting lithium mixture was charged into a firing container formed of magnesia, heated to 500° C. in an oxygen stream having a flow rate of 6 L/min at a heating speed of 2.77° C./min using a closed electric furnace, and held at 500° C. for 3 hours. Then, the lithium mixture was heated to 780° C. at a similar heating speed, held at 780° C. for 12 hours, and then furnace-cooled to room temperature to give a lithium-transition metal composite oxide.

(F) Water Washing Step

The resulting lithium-transition metal composite oxide was mixed with pure water in such a manner that a slurry having a concentration of 1500 g/L was formed. The slurry was washed with water using a stirrer for 30 min and then filtered. After filtered, the slurry was held at 210° C. for 14 hours using a vacuum drier. Then, the slurry was cooled to room temperature to give a positive electrode active material.

Evaluation of Positive Electrode Active Material

The resulting positive electrode active material was evaluated using the following method, and the evaluations are shown in Table 1 and Evaluation 1.

Composition and Alkali Metal Content

The composition of the resulting positive electrode active material was quantitatively analyzed using ICP emission spectrometry. The amount of alkali metals other than lithium in the positive electrode active material was measured using atomic absorption spectrometry.

Crystallite Diameter

The crystallite diameter of the positive electrode active material was calculated using 2θ and half-width of the (003)

surface of a diffraction pattern obtained by XRD-measuring the positive electrode active material, as well as using the Scerrer equation.

Specific Surface Area

The specific surface area of the positive electrode active material was measured using the BET method.

Mean Volume Diameter

The mean volume diameter (MV) was measured by laser diffraction/scattering.

Gap Count

The numbers of gaps and the particle cross-sectional lengths (μm) of any 20 particles were measured by observing cross-sections of the particles using a scanning electron microscope and then the gap count [(the sum of the measured numbers of gaps of the particles)/(the sum of the measured particle cross-sectional lengths of the particles)], which was an index about porosity, was calculated.

Evaluation of Initial Discharge Capacity

The initial discharge capacity of the positive electrode active material was evaluated using the following method.

Twenty mass % of acetylene black and 10 mass % of PTFE were mixed with 70 mass % of the powdery positive electrode active material, and 150 mg of the mixture was extracted and formed into a pellet serving as a positive electrode. Lithium metal was used as a negative electrode. As an electrolyte solution, there was used an equal amount mixed solution of ethylene carbonate (EC) and diethyl carbonate (DEC) using 1M of $LiClO_4$ as a supporting electrolyte (available from TOMIYAMA PURE CHEMICAL INDUSTRIES, Ltd.). A 2032-type coin battery as shown in FIG. 1 was produced in an Ar-atmosphere glove box in which the dew point was controlled to −80° C.

The produced battery was left alone for 24 hours. After the open circuit voltage (OCV) was stabilized, the current density with respect to the positive electrode was set to 0.5 $mA/cm^2$, and the battery was charged to a cutoff voltage of 4.3 V serving as the initial charge capacity. After rested for 1 hour, the battery was discharged to a cutoff voltage of 3.0 V, and the then capacity was regarded as the initial discharge capacity.

Evaluation of Cycle Characteristics

Cycle characteristics were evaluated using a capacity retention rate (%) measured using the following method. Each battery was CC-charged to 4.4 V at a temperature of 25° C. at a rate of 1C, rested for 10 min, then CC-discharged to 3.0 V at the same rate, and rested for 10 min. This charge-discharge cycle was repeated 200 times. The discharge capacity in the first cycle and the discharge capacity in the 200-th cycle were measured, and the percentage of the 2C discharge capacity in the 200-th cycle to the 2C discharge capacity in the first cycle [(2C discharge capacity in 200-th cycle/2C discharge capacity in first cycle)×100] was defined as the capacity retention rate (%).

Evaluation of Safety of Positive Electrode

The safety of the positive electrode was evaluated using a maximum exothermic peak height measured using the following method. A 2032-type coin battery produced using a method as described above was CCCV-charged to a cutoff voltage of 4.5 V and then disassembled while taking care so that a short circuit was avoided, and then the positive electrode was extracted. As used herein, the term "CCCV-charge" is an abbreviation of a constant current-constant voltage charge and refers to a charge using a two-phase charge process in which a charge first operates at a constant current and then ends at a constant voltage. Three mg of this electrode was weighed out, and 1.3 mg of an electrolyte solution was added. The mixture was sealed in a measurement container formed of aluminum, and the exothermic behavior from room temperature to 300° C. at a heating speed of 10° C./min was measured using a differential scanning calorimeter (DSC) PTC-10A (available from Rigaku Corporation).

Example 2

A positive electrode active material was prepared as in Example 1 except that the average particle diameter of the niobium compound was set to 8 μm, and evaluated for characteristics thereof. The evaluations of the positive electrode active material are shown in Table 1.

Example 3

A positive electrode active material was prepared as in Example 1 except that the niobium compound was niobium oxide and the average particle diameter thereof was set to 1 μm, and evaluated for characteristics thereof. The evaluations of the positive electrode active material are shown in Table 1.

Example 4

A positive electrode active material was prepared as in Example 1 except that the target niobium addition amount c' was set to 0.05, and evaluated for characteristics thereof. The evaluations of the positive electrode active material are shown in Table 1.

Example 5

A positive electrode active material was prepared as in Example 1 except that the target niobium addition amount c' was set to 0.005, and evaluated for characteristics thereof. The evaluations of the positive electrode active material are shown in Table 1.

Example 6

A positive electrode active material was prepared as in Example 1 except that the target niobium addition amount c' was set to 0.001, and evaluated for characteristics thereof. The evaluations of the positive electrode active material are shown in Table 1.

Example 7

A positive electrode active material was prepared as in Example 1 except that the firing temperature was set to 700° C., and evaluated for characteristics thereof. The evaluations of the positive electrode active material are shown in Table 1.

Example 8

A positive electrode active material was prepared as in Example 1 except that the firing temperature was set to 830° C., and evaluated for characteristics thereof. The evaluations of the positive electrode active material are shown in Table 1.

Example 9

A nickel-containing hydroxide obtained in (A) a crystallization step was heat-treated at 700° C. for 6 hours to give a nickel-containing oxide [(B) a heat treatment step]. Then, a positive electrode active material was prepared as in Example 1 except that the nickel-containing oxide obtained in the heat treatment step, lithium hydroxide, and niobic acid were mixed, and evaluated for characteristics thereof. The evaluations of the positive electrode active material are shown in Table 1.

Comparative Example 1

A positive electrode active material was prepared as in Example 1 except that the average particle diameter of the niobium compound was set to 15 μm, and evaluated for characteristics thereof. When this positive electrode active material was observed using a scanning electron microscope, an unreacted niobium compound was identified. For this reason, the positive electrode active material was added to 100 g/L of an aqueous solution of potassium hydroxide, stirred at 80° C. for 10 min to dissolve the unreacted niobium compound, and filtered to remove the niobium compound. Then, the composition of the resulting positive electrode active material was analyzed as in Example 1. The niobium content was equal to or less than the lower limit of analysis. The evaluations of the positive electrode active material are shown in Table 1.

Comparative Example 2

A positive electrode active material was prepared as in Example 1 except that the target niobium addition amount c' was set to 0.07, and evaluated for characteristics thereof. The evaluations of the positive electrode active material are shown in Table 1.

Comparative Example 3

A positive electrode active material was prepared as in Example 1 except that a mixed aqueous solution of nickel sulfate, cobalt sulfate, and a sodium aluminate aqueous solution, 25 mass % of a sodium hydroxide aqueous solution, and 25 mass % of ammonia water were simultaneously charged into a reaction tank in such a manner that the nickel:cobalt:aluminum molar ratio was 81.5:15.0:3.5; no niobium compound was added in a mixing step; and the firing temperature was set to 740° C., and evaluated for characteristics thereof. The evaluations of the positive electrode active material are shown in Table 1.

Comparative Example 4

A positive electrode active material was prepared as in Example 1 except that the firing temperature was set to 850° C., and evaluated for characteristics thereof. The evaluations of the positive electrode active material are shown in Table 1.

Comparative Example 5

A positive electrode active material was prepared as in Example 1 except that a Nb-coated, nickel-containing hydroxide (hereafter also referred to as "Nb-coated nickel hydroxide") was prepared by dropwise adding a niobic salt solution (30 g/L) prepared by dissolving niobic acid $(Nb_2O_5\text{-}xH_2O)$ in potassium hydroxide, to a slurry obtained by mixing a nickel-containing hydroxide obtained in a crystallization step with pure water, while adjusting pH to 10.0 using sulfuric acid; and the Nb-coated nickel hydroxide (the Nb amount c' was 0.01) was used in a mixing step without mixing a niobium compound, and evaluated for characteristics thereof. The evaluations of the positive electrode active material are shown in Table 1.

TABLE 1

| | Ni raw-material used in mixing step | niobium compound | | | | Li raw-material | firing temperature (° C.) | composition of lithium transition metal composite oxide |
| | | addition method | type | particle diameter (μm) | addition amount o' | | | |
|---|---|---|---|---|---|---|---|---|
| Example 1 | Ni-containing hydroxide | solid-phase addition | niobic acid | 0.6 | 0.01 | Li hydroxide | 780 | $Li_{1.05}(Ni_{0.807}Co_{0.149}Al_{0.035}Nb_{0.01})O_2$ |
| Example 2 | Ni-containing hydroxide | solid-phase addition | niobic acid | 8.0 | 0.01 | Li hydroxide | 780 | $Li_{1.05}(Ni_{0.807}Co_{0.149}Al_{0.035}Nb_{0.01})O_2$ |
| Example 3 | Ni-containing hydroxide | solid-phase addition | niobium oxide | 1.0 | 0.01 | Li hydroxide | 780 | $Li_{1.05}(Ni_{0.807}Co_{0.149}Al_{0.035}Nb_{0.01})O_2$ |
| Example 4 | Ni-containing hydroxide | solid-phase addition | niobic acid | 0.6 | 0.05 | Li hydroxide | 780 | $Li_{1.05}(Ni_{0.774}Co_{0.143}Al_{0.033}Nb_{0.05})O_2$ |
| Example 5 | Ni-containing hydroxide | solid-phase addition | niobic acid | 0.6 | 0.005 | Li hydroxide | 780 | $Li_{1.05}(Ni_{0.811}Co_{0.149}Al_{0.035}Nb_{0.005})O_2$ |
| Example 6 | Ni-containing hydroxide | solid-phase addition | niobic acid | 0.6 | 0.001 | Li hydroxide | 780 | $Li_{1.05}(Ni_{0.814}Co_{0.150}Al_{0.035}Nb_{0.001})O_2$ |
| Example 7 | Ni-containing hydroxide | solid-phase addition | niobic acid | 0.6 | 0.01 | Li hydroxide | 700 | $Li_{1.05}(Ni_{0.807}Co_{0.149}Al_{0.035}Nb_{0.01})O_2$ |
| Example 8 | Ni-containing hydroxide | solid-phase addition | niobic acid | 0.6 | 0.01 | Li hydroxide | 830 | $Li_{1.05}(Ni_{0.807}Co_{0.149}Al_{0.035}Nb_{0.01})O_2$ |
| Example 9 | Ni-containing oxide | solid-phase addition | niobic acid | 0.6 | 0.01 | Li hydroxide | 780 | $Li_{1.05}(Ni_{0.807}Co_{0.149}Al_{0.035}Nb_{0.01})O_2$ |
| Comparative Example 1 | Ni-containing hydroxide | solid-phase addition | niobic acid | 15.0 | 0.01 | Li hydroxide | 780 | $Li_{1.05}(Ni_{0.807}Co_{0.149}Al_{0.035}Nb_{0.01})O_2$ |
| Comparative Example 2 | Ni-containing hydroxide | solid-phase addition | niobic acid | 0.1 | 0.07 | Li hydroxide | 780 | $Li_{1.05}(Ni_{0.758}Co_{0.140}Al_{0.032}Nb_{0.07})O_2$ |
| Comparative Example 3 | Ni-containing hydroxide | — | — | — | — | Li hydroxide | 740 | $Li_{1.04}(Ni_{0.815}Co_{0.150}Al_{0.035})O_2$ |
| Comparative Example 4 | Ni-containing hydroxide | solid-phase addition | niobic acid | 0.6 | 0.01 | Li hydroxide | 850 | $Li_{1.05}(Ni_{0.807}Co_{0.149}Al_{0.035}Nb_{0.01})O_2$ |
| Comparative Example 5 | Nb-coated, Ni-containing | Nb coating | — | — | 0.01 | Li hydroxide | 780 | $Li_{1.05}(Ni_{0.807}Co_{0.149}Al_{0.035}Nb_{0.01})O_2$ |

TABLE 1-continued hydroxide

| | alkali metal amount (mass ppm) | SO$_4$ content (wt %) | crystallite diameter (nm) | specific surface area (m$^2$/g) | average particle diameter (μm) | initial discharge capacity (mAh/g) | maximum exothermic peak height (cal/s/g) | capacity retention rate after 200 cycles (%) | gap count (count/μm) |
|---|---|---|---|---|---|---|---|---|---|
| Example 1 | <20 | 0.03 | 82 | 2.11 | 12.42 | 197.1 | 1.4 | 93.1 | 6.1 |
| Example 2 | <20 | 0.04 | 78 | 1.99 | 12.65 | 196.1 | 1.4 | 88.1 | 5.8 |
| Example 3 | <20 | 0.04 | 81 | 2.22 | 12.55 | 155.6 | 1.5 | 92.1 | 5.7 |
| Example 4 | <20 | 0.04 | 71 | 2.55 | 12.75 | 190.1 | 0.9 | 86.1 | 7.2 |
| Example 5 | <20 | 0.03 | 85 | 1.23 | 12.73 | 199.7 | 1.7 | 91.3 | 4.3 |
| Example 6 | <20 | 0.03 | 142 | 1.50 | 12.83 | 203.2 | 3.8 | 90.5 | 3.4 |
| Example 7 | <20 | 0.04 | 72 | 2.67 | 12.92 | 188.6 | 1.0 | 90.3 | 6.4 |
| Example 8 | <20 | 0.04 | 144 | 0.96 | 12.91 | 187.4 | 1.7 | 89.9 | 2.9 |
| Example 9 | <20 | 0.05 | 83 | 1.49 | 12.86 | 186.5 | 1.3 | 91.1 | 5.2 |
| Comparative Example 1 | <20 | 0.04 | 71 | 1.78 | 12.85 | 209.4 | 2.1 | 88.9 | 2.8 |
| Comparative Example 2 | <20 | 0.03 | 65 | 3.18 | 12.67 | 182.6 | 0.5 | 82.4 | 0.4 |
| Comparative Example 3 | <20 | 0.02 | 134 | 1.47 | 12.85 | 196.2 | 7.0 | 83.5 | 0.8 |
| Comparative Example 4 | <20 | 0.04 | 176 | 0.86 | 12.82 | 164.5 | 6.3 | 79.3 | 3.0 |
| Comparative Example 5 | 32 | 0.35 | 89 | 3.53 | 12.78 | 196.1 | 1.4 | 82.0 | 6.8 |

Evaluation 1

As shown in Table 1, the positive electrode active materials of Examples 1 to 9 exhibited good initial discharge capacities above 185 mAh/g. These positive electrode active materials also exhibited capacity retention rates of 85% or more after 200 cycles, that is, exhibited excellent cycle characteristics. Example 4 had a large niobium addition amount and therefore exhibited somewhat lower cycle characteristics than the other Examples. The positive electrode active materials of Examples 1 to 9 exhibited DSC-measurement maximum exothermic peak heights of 4.0 cal/sec/g or less and significantly reduced the calorific value compared to a conventional positive electrode active material (Comparative Example 3) to which no niobium was added, that is, exhibited good thermal stability.

When cross-sections of the positive electrode active materials of Examples 1 to 8 were observed using a transmission electron microscope, no heterogenous phase was identified, and niobium was solidly dissolved in the lithium-transition metal composite oxide. When the distribution of niobium in the positive electrode active materials of Examples 1 to 8 was EDX-analyzed, it was confirmed that niobium was uniformly distributed in each positive electrode active material and that the ratio of the Nb concentration in the grain boundaries to that in the particles was 3 or less.

When a cross-section of the positive electrode active material of Example 9 was observed using a transmission electron microscope, a heterogeneous phase having a maximum diameter above 200 nm was identified in the grain boundaries and confirmed to be a niobium compound by EDX analysis. The positive electrode active material of Example 9 also exhibited an initial discharge capacity (186.5 mAh/g) somewhat lower than the other Examples. The reason seems that the use of the nickel-containing oxide in the mixing step reduced the reactivity with the nickel compound and thus the niobium compound present in the grain boundaries had an effect on the electrochemical reactivity.

For Comparative Example 1, on the other hand, the average particle diameter of the niobium compound was 15 μm; the niobium compound exhibited low reactivity; and the number of unreacted niobium compounds was increased and therefore no niobium was contained in the positive electrode active material. Accordingly, Comparative Example 1 exhibited a very high maximum exothermic peak height (7.1 cal/sec/g), that is, exhibited low thermal stability. Comparative Example 2 had a large niobium addition amount of 0.07 and exhibited significantly low initial discharge capacity and cycle characteristics. Comparative Example 3, which was a conventional niobium-free positive electrode active material, exhibited a high initial discharge capacity, that is, exhibited excellent cycle characteristics, but exhibited a very high maximum exothermic peak height (7.0 cal/sec/g), that is, exhibited poor thermal stability. Comparative Example 4, which was fired at high temperature, caused cation mixing, in which nickel was mixed into the lithium layer of a lithium-transition metal composite oxide, which was a layered compound. It also had a small specific surface area and exhibited a significantly low initial discharge capacity and a high maximum exothermic peak height.

Comparative Example 5, to which niobium was added by coating, had a high impurity (alkali metals other than lithium) content and exhibited low cycle characteristics.

Example 10

(A) Crystallization Step

A mixed aqueous solution of nickel sulfate, cobalt sulfate, and a sodium aluminate aqueous solution, 25 mass % of a sodium hydroxide aqueous solution, and 25 mass % of ammonia water were simultaneously charged into a reaction tank in such a manner that the nickel:cobalt:aluminum molar ratio was 81.5:15.0:3.5; pH was maintained at 11.8 with respect to a solution temperature of 25° C.; the reaction temperature was maintained at 50° C.; the ammonia concentration was maintained at 10 g/L; and a precipitate consisting of spherical secondary particles was formed by crystallization reaction. After the inside of the reaction tank was stabilized, a slurry of the precipitate was collected from an overflow outlet, filtered, water-washed, and then dried to give a nickel-containing hydroxide [Ni$_{0.815}$Co$_{0.15}$Al$_{0.035}$(OH)$_2$].

(C) Mixing Step

Commercially available lithium hydroxide monohydrate was dried in a vacuum at 150° C. for 12 hours to prepare anhydrous lithium hydroxide (moisture content 0.4 mass %). The vacuum-dried (at 150° C. for 12 hours) anhydrous lithium hydroxide was further dried in a vacuum at 200° C. for 8 hours. Assuming that the moisture content of the resulting anhydrous lithium hydroxide was 0 mass % and the moisture content of stoichiometric lithium hydroxide monohydrate was 100 mass %, a relative moisture content was calculated from a variation in mass between before and after the drying.

The above nickel-containing hydroxide, the anhydrous lithium hydroxide, and a niobic acid powder ($Nb_2O_5 \cdot xH_2O$) having an average particle diameter of 0.6 μm obtained by grinding niobic acid using a nano-grinding jet mill were weighed out in such a manner that Li/Me was 1.10 and the niobium addition amount c was 0.01. Then, these compounds were sufficiently mixed with intensity such that the shape of the nickel-containing hydroxide was maintained, using a shaker mixer [TURBULA Type T2C available from Willy A. Bachofen AG (WAB)] to give a lithium mixture.

(D) Firing Step

The resulting lithium mixture was charged into a firing container formed of magnesia, heated to 500° C. in an oxygen stream having a flow rate of 6 L/min at a heating speed of 2.77° C./min using a closed electric furnace, and held at 500° C. for 3 hours. Then, the lithium mixture was heated to 780° C. at a similar heating speed, held for 12 hours, and then furnace-cooled to room temperature to give a lithium-transition metal composite oxide.

(E) Water Washing Step

The resulting lithium-transition metal composite oxide was mixed with pure water in such a manner that a slurry having a concentration of 1500 g/L was formed. The slurry was washed with water using a stirrer for 30 min and then filtered. After filtered, the slurry was maintained at 210° C. using a vacuum dryer for 14 hours and cooled to room temperature to give a positive electrode active material.

Evaluation of Positive Electrode Active Material

Characteristics of the resulting positive electrode active material were evaluated as in Example 1. The evaluations of the positive electrode active material are shown in Table 2 and Evaluation 2.

Example 11

A positive electrode active material was prepared and evaluated as in Example 10 except that the moisture content of the anhydrous lithium hydroxide was set to 3.0 mass %. The evaluations of the positive electrode active material are shown in Table 2 and Evaluation 2.

Example 12

A positive electrode active material was prepared and evaluated as in Example 10 except that lithium hydroxide monohydrate (moisture content 99.7 mass %) was used as the lithium compound. The evaluations of the positive electrode active material are shown in Table 2 and Evaluation 2.

Example 13

A positive electrode active material was prepared and evaluated as in Example 10 except that the niobium addition amount c was set to 0.005. The evaluations of the positive electrode active material are shown in Table 2 and Evaluation 2.

Example 14

A positive electrode active material was prepared and evaluated as in Example 10 except that the niobium addition amount c was set to 0.001. The evaluations of the positive electrode active material are shown in Table 2 and Evaluation 2.

Example 15

A positive electrode active material was prepared and evaluated as in Example 10 except that a nickel-containing oxide obtained by heat-treating nickel-containing hydroxide at 600° C. for 12 hours was used in the mixing step. The evaluations of the positive electrode active material are shown in Table 2 and Evaluation 2.

Example 16

A positive electrode active material was prepared and evaluated as in Example 10 except that a nickel-containing oxide obtained by heat-treating and oxidizing-roasting nickel-containing hydroxide at 600° C. for 12 hours was used in the mixing step and lithium hydroxide monohydrate (moisture content 99.7 mass %) was used as the lithium compound. The evaluations of the positive electrode active material are shown in Table 2 and Evaluation 2.

Comparative Example 6

A positive electrode active material was prepared as in Example 10 except that no niobium compound was added, and evaluated for characteristics thereof. The evaluations of the positive electrode active material are shown in Table 2.

Comparative Example 7

A positive electrode active material was prepared as in Example 10 except that a Nb-coated nickel-containing hydroxide (Nb-coated nickel hydroxide) was prepared by dropwise adding a niobic salt solution (30 g/L) prepared by dissolving niobic acid ($Nb_2O_5 \cdot xH_2O$) in potassium hydroxide to a slurry obtained by mixing a nickel-containing hydroxide obtained in a crystallization step with pure water, while adjusting pH to 8.0 using sulfuric acid; the above Nb-coated nickel hydroxide (the Nb amount c was 0.01) was used in the mixing step without mixing a niobium compound; and lithium hydroxide (moisture content 99.7 mass %) was used as the lithium compound, and evaluated for characteristics thereof. The evaluations of the positive electrode active material are shown in Table 2.

Comparative Example 8

A positive electrode active material was prepared as in Example 10 except that a nickel-containing hydroxide was prepared in a crystallization step by adding a niobic salt solution (72 g/L) prepared by dissolving niobic acid ($Nb_2O_5 \cdot xH_2O$) in potassium hydroxide; and the above nickel-containing hydroxide (the Nb amount c was 0.01) was used in a mixing step without mixing a niobium compound, and evaluated for characteristics thereof. The evaluations of the positive electrode active material are shown in Table 2.

TABLE 2

| | niobium compound | | | | | Li | |
|---|---|---|---|---|---|---|---|
| | Ni raw-material used in mixing step | addition method | type | particle diameter (μm) | addition amount o' | Li raw-material | hydroxide moisture content (wt %) | composition of lithium transition metal composite oxide |
| Example 10 | Ni-containing hydroxide | solid-phase addition | niobic acid | 0.6 | 0.01 | anhydrous Li hydroxide | 0.4 | $Li_{105}(Ni_{0807}Co_{0149}Al_{0035}Nb_{001})O_2$ |
| Example 11 | Ni-containing hydroxide | solid-phase addition | niobic acid | 0.6 | 0.01 | anhydrous Li hydroxide | 3.0 | $Li_{105}(Ni_{0807}Co_{0149}Al_{0035}Nb_{001})O_2$ |
| Example 12 | Ni-containing hydroxide | solid-phase addition | niobic acid | 0.6 | 0.01 | Li hydroxide | 99.7 | $Li_{105}(Ni_{0807}Co_{0149}Al_{0035}Nb_{001})O_2$ |
| Example 13 | Ni-containing hydroxide | solid-phase addition | niobic acid | 0.6 | 0.005 | anhydrous Li hydroxide | 0.3 | $Li_{105}(Ni_{0811}Co_{0149}Al_{0035}Nb_{005})O_2$ |
| Example 14 | Ni-containing hydroxide | solid-phase addition | niobic acid | 0.6 | 0.001 | anhydrous Li hydroxide | 0.4 | $Li_{105}(Ni_{0814}Co_{0150}Al_{0035}Nb_{001})O_2$ |
| Example 15 | Ni-containing oxide | solid-phase addition | niobic acid | 0.6 | 0.01 | anhydrous Li hydroxide | 0 | $Li_{105}(Ni_{0807}Co_{0149}Al_{0035}Nb_{001})O_2$ |
| Example 16 | Ni-containing oxide | solid-phase addition | niobic acid | 0.6 | 0.01 | Li hydroxide | 99.7 | $Li_{105}(Ni_{0807}Co_{0149}Al_{0035}Nb_{001})O_2$ |
| Comparative Example 6 | Ni-containing hydroxide | — | — | — | — | anhydrous Li hydroxide | 0.4 | $Li_{104}(Ni_{0815}Co_{0150}Al_{0035})O_2$ |
| Comparative Example 7 | Nb-coated, Ni-containing hydroxide | Nb coating | — | — | 0.01 | Li hydroxide | 99.7 | $Li_{105}(Ni_{0807}Co_{0149}Al_{0035}Nb_{001})O_2$ |
| Comparative Example 8 | Ni-containing hydroxide, (containing Nb) | co-precipitation | — | — | 0.01 | anhydrous Li hydroxide | 0.4 | $Li_{105}(Ni_{0807}Co_{0149}Al_{0035}Nb_{001})O_2$ |

| | alkali metal amount (mass ppm) | $SO_4$ content (wt %) | crystallite diameter (nm) | specific surface area (m²/g) | average particle diameter (μm) | initial discharge capacity (mAh/g) | maximum exothermic peak height (cal/s/g) | capacity retention rate after 200 cycles (%) | gap count (count/μm) |
|---|---|---|---|---|---|---|---|---|---|
| Example 10 | <20 | 0.04 | 81 | 2.25 | 12.5 | 201.2 | 1.4 | 94.0 | 6.1 |
| Example 11 | <20 | 0.03 | 78 | 2.58 | 11.8 | 200.0 | 1.3 | 93.5 | 6.2 |
| Example 12 | <20 | 0.03 | 74 | 2.86 | 11.4 | 193.8 | 1.5 | 93.1 | 6.2 |
| Example 13 | <20 | 0.04 | 84 | 2.15 | 12.7 | 199.8 | 1.7 | 91.5 | 3.9 |
| Example 14 | <20 | 0.03 | 140 | 1.43 | 12.9 | 204.5 | 3.8 | 90.7 | 3.2 |
| Example 15 | <20 | 0.04 | 79 | 1.68 | 11.5 | 187.3 | 1.3 | 91.2 | 5.1 |
| Example 16 | <20 | 0.05 | 75 | 1.81 | 11.1 | 183.1 | 1.4 | 90.7 | 5.3 |
| Comparative Example 6 | <20 | 0.02 | 142 | 1.32 | 11.4 | 195.2 | 7.1 | 88.2 | 0.7 |
| Comparative Example 7 | 35 | 0.34 | 87 | 3.45 | 12.1 | 197.1 | 1.4 | 88.1 | 6.9 |
| Comparative Example 8 | 25 | 0.28 | 43 | 3.80 | 13.1 | 188.1 | 1.9 | 80.8 | 7.1 |

Evaluation 2

As shown in Table 2, the positive electrode active materials of Examples 10 to 16 exhibited initial discharge capacities above 183 mAh/gm, that is, exhibited good initial capacities. These positive electrode active materials also exhibited capacity retention rates of about 90% or more after 200 cycles, that is, exhibited excellent cycle characteristics. These positive electrode active materials also exhibited maximum exothermic peak heights of 4 cal/sec/g or less, that is, exhibited significantly reduced calorific values compared to a conventional niobium-free positive electrode active material (Comparative Example 6), as well as exhibited improved cycle characteristics.

Examples 10, 11, and 13 used anhydrous lithium hydroxide having low moisture content and exhibited further improved initial discharge capacities, cycle characteristics, and maximum exothermic peak heights compared to Example 12, which used lithium hydroxide monohydrate. The reason seems that the use of the anhydrous lithium hydroxide having low moisture content facilitated firing and increased the reactivity among lithium, nickel-containing hydroxide, and niobium. Example 14 had a small niobium addition amount and therefore exhibited a high initial discharge capacity, but exhibited a somewhat high maximum exothermic peak height.

When cross-sections of the positive electrode active materials of Examples 10 to 14 were observed using a transmission electron microscope, no heterogenous phase was identified, and niobium was solidly dissolved in the lithium-transition metal composite oxide. Further, when the distribution of niobium in the positive electrode active materials of Examples 10 to 14 was EDX-analyzed, it was confirmed that niobium was uniformly distributed in the positive electrode active materials and that the ratio of the Nb concentration in the grain boundaries to that in the particles was 3 or less.

When cross-sections of the positive electrode active materials of Examples 15 and 16 were observed using a transmission electron microscope, a heterogeneous phase having a maximum diameter above 200 nm was identified in the grain boundaries and confirmed to be a niobium compound by EDX analysis. Examples and 15 and 16 also exhibited somewhat lower initial discharge capacities (about 183 to 187 mAh/g) than the other Examples. The reason seems that the use of the nickel-containing oxide in the mixing step reduced the reactivity with the nickel compound and thus the niobium compound present in the grain boundaries had an effect on the electrochemical reactivity.

Comparative Example 7, in which nickel-containing hydroxide was coated with niobium, exhibited a high initial discharge capacity of about 197 mAh/g and a low maximum exothermic peak height, but had an increased sulfate group content and exhibited lower cycle characteristics than the Examples. Comparative Example 8, to which niobium was added during crystallization, had a fine nickel-containing hydroxide particle structure, had a larger amount of alkali metals other than lithium and a higher sulfate group content, had a smaller crystallite diameter, and exhibited lower cycle characteristics than the Examples. Comparative Example 8 also exhibited a lower initial discharge capacity and somewhat higher maximum exothermic peak height than Example 10, which used similar raw materials but to which niobium was added in a different manner.

INDUSTRIAL APPLICABILITY

The nonaqueous electrolyte secondary battery of the present invention has excellent safety, as well as a high initial capacity and excellent cycle characteristics. Thus, this nonaqueous electrolyte secondary battery can be suitably used as power supplies for small portable electronic devices which are required to always have high capacity and long life. In the case of power supplies for electric vehicles and stationary storage batteries, upsizing the battery makes it difficult to ensure safety and requires mounting of an expensive protection circuit for ensuring higher safety. On the other hand, the lithium-ion secondary battery of the present invention has excellent safety and therefore can make it easy to ensure the safety of the battery, as well as can simplify an expensive protection circuit to reduce cost. For this reasons, this lithium-ion secondary battery can be suitably used as power supplies for electric vehicles and stationary storage batteries. The electric vehicles here include electric vehicles which are driven purely by electrical energy, as well as so-called hybrid vehicles, which use both electrical energy and a combustion engine, such as a gasoline engine or diesel engine.

DESCRIPTION OF REFERENCE SIGNS 1 lithium metal negative electrode
2 separator (impregnated with electrolyte solution)
3 positive electrode (evaluation electrode)
4 gasket
5 negative electrode can
6 positive electrode can
7 collector

The invention claimed is:

1. A method for producing a positive electrode active material for nonaqueous electrolyte secondary batteries, the positive electrode active material comprising a lithium-transition metal composite oxide represented by a general formula $Li_dNi_{1-a-b-c}Co_aM_bNb_cO_2$, where $0.03 \leq a \leq 0.35$; $0 \leq b \leq 0.10$; $0.001 \leq c \leq 0.05$; $0.95 \leq d \leq 1.20$; and M is at least one element selected from Mn, V, Mg, Ti, and Al and consisting of particles of polycrystalline structure, the method comprising:
a crystallization step of adding an alkaline aqueous solution to a mixed aqueous solution containing at least nickel and cobalt for crystallization to obtain a nickel-containing hydroxide represented by a general formula $Ni_{1-a'-b'}Co_{a'}M_{b'}(OH)_2$ where $0.03 \leq a' \leq 0.35$; $0 \leq b' \leq 0.10$; and M is at least one element selected from Mn, V, Mg, Ti, and Al;
a mixing step of mixing the nickel-containing hydroxide, a lithium compound, and a niobium compound having an average particle diameter of 0.1 to 10 μm to obtain a lithium mixture; and
a firing step of firing the lithium mixture in an oxidative atmosphere at 700 to 840° C. to obtain the lithium-transition metal composite oxide,
wherein the lithium-transition metal composite oxide has a specific surface area of 0.9-4.0 m²/g.

2. The method for producing a positive electrode active material for nonaqueous electrolyte secondary batteries of claim 1, wherein the crystallization step comprises adding the alkaline aqueous solution to the mixed aqueous solution containing at least nickel and cobalt for crystallization and then coating a resulting precipitation with M to obtain the nickel-containing hydroxide.

3. The method for producing a positive electrode active material for nonaqueous electrolyte secondary batteries of claim 1, wherein the niobium compound is niobic acid or niobium oxide.

4. The method for producing a positive electrode active material for nonaqueous electrolyte secondary batteries of claim 1, wherein, in the mixing step, a nickel-containing oxide is also mixed in addition to the nickel-containing hydroxide, the lithium compound, and the niobium compound to obtain the lithium mixture.

5. The method for producing a positive electrode active material for nonaqueous electrolyte secondary batteries of claim 1, wherein the lithium compound is lithium hydroxide.

6. The method for producing a positive electrode active material for nonaqueous electrolyte secondary batteries of claim 5, wherein the lithium hydroxide is anhydrous lithium hydroxide having a moisture content of 5 mass % or less.

7. The method for producing a positive electrode active material for nonaqueous electrolyte secondary batteries of claim 5, further comprising a drying step of, prior to the firing step, drying the lithium mixture obtained in the mixing step so that lithium hydroxide in the lithium mixture becomes anhydrous lithium hydroxide having a moisture content of 5 mass % or less.

8. The method for producing a positive electrode active material for nonaqueous electrolyte secondary batteries of claim 1, further comprising a water washing step of, after the firing step, adding the lithium-transition metal composite oxide to water at a ratio of 100 to 2000 g of the lithium-transition metal composite oxide to 1 L of water to form a slurry and then washing the slurry with water.

9. A positive electrode active material for nonaqueous electrolyte secondary batteries, comprising a lithium-transition metal composite oxide represented by a general formula $Li_dNi_{1-a-b-c}Co_aM_bNb_cO_2$ where $0.03 \leq a \leq 0.35$; $0 \leq b \leq 0.10$; $0.001 \leq c \leq 0.05$; $0.95 \leq d \leq 1.20$; and M is at least one element selected from Mn, V, Mg, Ti, and Al and consisting of particles of polycrystalline structure, wherein
a specific surface area of the positive electrode active material is 0.9 to 2.8 m²/g,
a crystallite diameter of the positive electrode active material is 10 to 150 nm, and
a content of alkali metals other than lithium is 20 mass ppm or less,
when the particles of the positive electrode active material are EDX-measured using a transmission electron microscope, no different phase is observed in the particles of the positive electrode active material, and niobium solidly dissolves in the particles of the positive electrode active material.

10. The positive electrode active material for nonaqueous electrolyte secondary batteries of claim 9, wherein the specific surface area of the positive electrode active material is 0.9 to 2.6 m²/g.

11. The positive electrode active material for nonaqueous electrolyte secondary batteries of claim 9, wherein a maximum diameter of a niobium compound in the particles of the positive electrode active material observed by EDX measurement using a transmission electron microscope is 200 nm or less.

12. The positive electrode active material for nonaqueous electrolyte secondary batteries of any one of claim 9, wherein a sulfate group content of the positive electrode active material is 0.2 mass % or less.

13. The positive electrode active material for nonaqueous electrolyte secondary batteries of claim 9, wherein the positive electrode active material has a porous structure.

14. A nonaqueous electrolyte secondary battery, wherein the positive electrode active material for nonaqueous electrolyte secondary batteries of claim 9 is used as a positive electrode.

15. A method for producing a positive electrode active material for nonaqueous electrolyte secondary batteries, the positive electrode active material comprising a lithium-transition metal composite oxide represented by a general formula $Li_dNi_{1-a-b-c}Co_aM_bNb_cO_2$, where $0.03 \leq a \leq 0.35$; $0 \leq b \leq 0.10$; $0.001 \leq c \leq 0.05$; $0.95 \leq d \leq 1.20$; and M is at least one element selected from Mn, V, Mg, Ti, and Al and consisting of particles of polycrystalline structure, the method comprising:

a crystallization step of adding an alkaline aqueous solution to a mixed aqueous solution containing at least nickel and cobalt for crystallization to obtain a nickel-containing hydroxide represented by a general formula $Ni_{1-a'-b}Co_aM_b(OH)_2$ where $0.03 \leq a' \leq 0.35$; $0 \leq b' \leq 0.10$; and M is at least one element selected from Mn, V, Mg, Ti, and Al;

a heat treatment step of heat-treating the nickel-containing hydroxide at a temperature of 105 to 800° C.;

a mixing step of mixing a nickel-containing hydroxide and/or a nickel-containing oxide obtained in the heat treatment step, the lithium compound, and the niobium compound having an average particle diameter of 0.1 to 10 μm to obtain a lithium mixture; and a firing step of firing the lithium mixture in an oxidative atmosphere at 700 to 840° C. to obtain the lithium-transition metal composite oxide, wherein the lithium-transition metal composite oxide has a specific surface area of 0.9 to 4.0 m²/g.

16. The method for producing a positive electrode active material for nonaqueous electrolyte secondary batteries of claim 15, wherein the crystallization step comprises adding the alkaline aqueous solution to the mixed aqueous solution containing at least nickel and cobalt for crystallization and then coating a resulting precipitation with M to obtain the nickel-containing hydroxide.

17. The method for producing a positive electrode active material for nonaqueous electrolyte secondary batteries of claim 15, wherein the niobium compound is niobic acid or niobium oxide.

18. The method for producing a positive electrode active material for nonaqueous electrolyte secondary batteries of claim 15, wherein the lithium compound is lithium hydroxide.

19. The method for producing a positive electrode active material for nonaqueous electrolyte secondary batteries of claim 18, wherein the lithium hydroxide is anhydrous lithium hydroxide having a moisture content of 5 mass % or less.

20. The method for producing a positive electrode active material for nonaqueous electrolyte secondary batteries of claim 18, further comprising a drying step of, prior to the firing step, drying the lithium mixture obtained in the mixing step so that lithium hydroxide in the lithium mixture becomes anhydrous lithium hydroxide having a moisture content of 5 mass % or less.

21. The method for producing a positive electrode active material for nonaqueous electrolyte secondary batteries of claim 15, further comprising a water washing step of, after the firing step, adding the lithium-transition metal composite oxide to water at a ratio of 100 to 2000 g of the lithium-transition metal composite oxide to 1 L of water to form a slurry and then washing the slurry with water.

* * * * *